(12) United States Patent
Attar et al.

(10) Patent No.: US 8,396,152 B2
(45) Date of Patent: Mar. 12, 2013

(54) FEEDBACK CHANNEL DESIGN FOR MULTIPLE-INPUT MULTIPLE-OUTPUT COMMUNICATION SYSTEMS

(75) Inventors: Rashid Ahmed Akbar Attar, San Diego, CA (US); Naga Bhushan, San Diego, CA (US); Mingxi Fan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1098 days.

(21) Appl. No.: 11/676,981

(22) Filed: Feb. 20, 2007

(65) Prior Publication Data

US 2007/0195908 A1 Aug. 23, 2007

Related U.S. Application Data

(60) Provisional application No. 60/775,443, filed on Feb. 21, 2006, provisional application No. 60/775,693, filed on Feb. 21, 2006.

(51) Int. Cl.
*H04B 7/02* (2006.01)

(52) U.S. Cl. ........................... 375/267; 375/299

(58) Field of Classification Search .................. 375/260, 375/267, 346, 347, 299
See application file for complete search history.

(56) References Cited

U.S. PATENT DOCUMENTS

| | | | |
|---|---|---|---|
| 6,078,572 A | 6/2000 | Tanno et al. |
| 6,130,886 A | 10/2000 | Ketseoglou et al. |
| 6,694,469 B1 | 2/2004 | Jalali et al. |
| 6,717,924 B2 | 4/2004 | Ho et al. |
| 6,788,687 B2 | 9/2004 | Bao et al. |
| 6,822,952 B2 | 11/2004 | Abrol et al. |
| 6,882,632 B1 | 4/2005 | Koo et al. |
| 6,912,214 B2 | 6/2005 | Madour et al. |
| 6,963,534 B1 | 11/2005 | Shorey et al. |
| 6,970,437 B2 | 11/2005 | Lott et al. |
| 6,980,569 B1 | 12/2005 | Beyda et al. |

(Continued)

FOREIGN PATENT DOCUMENTS

| | | |
|---|---|---|
| EP | 0959634 A2 | 11/1999 |
| EP | 0995275 | 4/2000 |

(Continued)

OTHER PUBLICATIONS

Mingxi Fan et al., "On the reverse link performance of cdma2000 1xEV-Do Revivion A System", IEEE XPLORE, Online, Feb. 2005, pp. 2244-2250, XP002438335, New York, USA.

(Continued)

*Primary Examiner* — David B. Lugo
(74) *Attorney, Agent, or Firm* — Charles E. Eggers

(57) ABSTRACT

A data-optimized communication system provides support for legacy access terminals, such as access terminals operating under the 1xEV-DO standard. The system also supports multiple-input multiple-output (MIMO) communications with access terminals configured to support MIMO. A number of MIMO spatial signatures are predefined or negotiated. MIMO rank and an identifier of the spatial signature determined at the MIMO access terminal are sent on the I-Branch and Q-Branch of the existing 1xEV-DO structure. In one embodiment, 1-bit rank and 3-bit spatial signature are transmitted through the I-Branch as a 4-bit symbol, replacing the data rate control (DRC) channel. In another embodiment, a 4-bit spatial signature is transmitted through the I-Branch, also replacing the DRC channel. A 2-bit rank is transmitted together with a 4-bit DRC channel through the Q-Branch. The 2-bit rank and the DRC channel can be distinguished because they are sent using different orthogonal codeword Walsh covers.

66 Claims, 13 Drawing Sheets

U.S. PATENT DOCUMENTS

| | | | |
|---|---|---|---|
| 6,987,780 B2 | 1/2006 | Wei et al. | |
| 7,002,900 B2 | 2/2006 | Walton et al. | |
| 7,042,869 B1 | 5/2006 | Bender | |
| 7,043,249 B2 | 5/2006 | Sayeedi | |
| 7,050,405 B2 | 5/2006 | Attar et al. | |
| 7,062,283 B2 | 6/2006 | Dooley | |
| 7,065,060 B2 | 6/2006 | Yun et al. | |
| 7,088,701 B1 | 8/2006 | Attar et al. | |
| 7,099,629 B1 | 8/2006 | Bender | |
| 7,127,654 B2 | 10/2006 | Jalali et al. | |
| 7,139,274 B2 | 11/2006 | Attar et al. | |
| 7,145,940 B2 | 12/2006 | Gore et al. | |
| 7,170,876 B2 | 1/2007 | Wei et al. | |
| 7,463,867 B2 * | 12/2008 | Luo et al. | 455/101 |
| 7,680,211 B1 * | 3/2010 | von der Embse | 375/299 |
| 7,719,991 B2 | 5/2010 | Bhushan et al. | |
| 7,764,981 B2 | 7/2010 | Kalofonos et al. | |
| 8,077,595 B2 | 12/2011 | Bhushan et al. | |
| 2001/0009555 A1 | 7/2001 | Diepstraten et al. | |
| 2002/0002704 A1 | 1/2002 | Davis et al. | |
| 2002/0145990 A1 | 10/2002 | Sayeedi | |
| 2002/0193112 A1 | 12/2002 | Aoki et al. | |
| 2003/0040315 A1 | 2/2003 | Khaleghi et al. | |
| 2003/0072254 A1 | 4/2003 | Ma et al. | |
| 2003/0153327 A1 | 8/2003 | Tajiri et al. | |
| 2003/0220103 A1 | 11/2003 | Kim et al. | |
| 2003/0235147 A1 | 12/2003 | Walton et al. | |
| 2004/0022203 A1 | 2/2004 | Michelson et al. | |
| 2004/0063431 A1 | 4/2004 | Julka et al. | |
| 2004/0095851 A1 | 5/2004 | Ellner et al. | |
| 2004/0141481 A1 | 7/2004 | Lee et al. | |
| 2004/0147223 A1 | 7/2004 | Cho | |
| 2004/0228267 A1 | 11/2004 | Agrawal et al. | |
| 2005/0063298 A1 | 3/2005 | Ling et al. | |
| 2005/0073969 A1 | 4/2005 | Hart et al. | |
| 2005/0111397 A1 | 5/2005 | Attar et al. | |
| 2005/0111437 A1 | 5/2005 | Maturi | |
| 2005/0111599 A1 | 5/2005 | Walton et al. | |
| 2005/0135284 A1 | 6/2005 | Nanda et al. | |
| 2005/0135291 A1 | 6/2005 | Ketchum et al. | |
| 2005/0135318 A1 | 6/2005 | Walton et al. | |
| 2005/0135403 A1 | 6/2005 | Ketchum et al. | |
| 2005/0135416 A1 | 6/2005 | Ketchum et al. | |
| 2005/0141475 A1 | 6/2005 | Vijayan et al. | |
| 2005/0163262 A1 | 7/2005 | Gupta | |
| 2005/0195763 A1 | 9/2005 | Kadous et al. | |
| 2005/0249177 A1 | 11/2005 | Huo et al. | |
| 2005/0270969 A1 | 12/2005 | Han et al. | |
| 2005/0281290 A1 | 12/2005 | Khandekar et al. | |
| 2006/0018397 A1 | 1/2006 | Sampath et al. | |
| 2006/0018411 A1 | 1/2006 | Gore et al. | |
| 2006/0023772 A1 | 2/2006 | Mudulodu et al. | |
| 2006/0078075 A1 | 4/2006 | Stamoulis et al. | |
| 2006/0088003 A1 | 4/2006 | Harris | |
| 2006/0133273 A1 | 6/2006 | Julian et al. | |
| 2006/0133521 A1 | 6/2006 | Sampath et al. | |
| 2006/0135080 A1 | 6/2006 | Khandekar et al. | |
| 2006/0136790 A1 | 6/2006 | Julian et al. | |
| 2006/0171295 A1 | 8/2006 | Ihm et al. | |
| 2006/0198344 A1 | 9/2006 | Teague et al. | |
| 2006/0203794 A1 | 9/2006 | Sampath et al. | |
| 2006/0203845 A1 | 9/2006 | Monogioudis | |
| 2006/0205413 A1 | 9/2006 | Teague | |
| 2006/0209732 A1 | 9/2006 | Gorokhov et al. | |
| 2006/0209927 A1 | 9/2006 | Khandekar et al. | |
| 2006/0217124 A1 | 9/2006 | Bi et al. | |
| 2006/0227887 A1 | 10/2006 | Li et al. | |
| 2006/0233124 A1 | 10/2006 | Palanki | |
| 2006/0233131 A1 | 10/2006 | Gore et al. | |
| 2006/0240784 A1 | 10/2006 | Naguib et al. | |
| 2006/0274712 A1 | 12/2006 | Malladi et al. | |
| 2006/0276212 A1 | 12/2006 | Sampath et al. | |
| 2006/0286974 A1 | 12/2006 | Gore et al. | |
| 2007/0010957 A1 | 1/2007 | Sampath et al. | |
| 2007/0011589 A1 | 1/2007 | Palanki | |
| 2007/0019535 A1 | 1/2007 | Sambhwani et al. | |
| 2007/0025325 A1 | 2/2007 | Kumar | |
| 2007/0030839 A1 | 2/2007 | Vimpari et al. | |
| 2007/0070942 A1 | 3/2007 | Harris et al. | |
| 2007/0087749 A1 | 4/2007 | Ionescu et al. | |
| 2007/0195688 A1 | 8/2007 | Bhushan et al. | |
| 2007/0195723 A1 | 8/2007 | Attar et al. | |
| 2007/0195740 A1 | 8/2007 | Bhushan et al. | |
| 2007/0195747 A1 | 8/2007 | Attar et al. | |
| 2007/0195899 A1 | 8/2007 | Bhushan et al. | |
| 2007/0293172 A1 | 12/2007 | Shi et al. | |
| 2008/0151743 A1 | 6/2008 | Tong et al. | |
| 2009/0067405 A1 | 3/2009 | Zhang et al. | |
| 2009/0310702 A1 | 12/2009 | Lewis | |
| 2012/0014392 A1 | 1/2012 | Bhushan et al. | |

FOREIGN PATENT DOCUMENTS

| | | |
|---|---|---|
| EP | 1367760 A | 12/2003 |
| EP | 1422851 A1 | 5/2004 |
| EP | 1489775 A1 | 12/2004 |
| EP | 1513304 A2 | 3/2005 |
| EP | 1542488 A1 | 6/2005 |
| EP | 1565015 A2 | 8/2005 |
| EP | 1596525 A1 | 11/2005 |
| EP | 1608120 A2 | 12/2005 |
| EP | 1619847 A2 | 1/2006 |
| GB | 2394871 A | 5/2004 |
| JP | 2000270024 | 9/2000 |
| JP | 2002320260 A | 10/2002 |
| JP | 2002374562 A | 12/2002 |
| JP | 2002544733 | 12/2002 |
| JP | 2003533078 | 11/2003 |
| JP | 2004158901 A | 6/2004 |
| JP | 2005510904 A | 4/2005 |
| JP | 2005536967 T | 12/2005 |
| JP | 2006270968 A | 10/2006 |
| JP | 2009503912 A | 1/2009 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | WO0176110 A2 | 10/2001 |
| WO | WO0180477 | 10/2001 |
| WO | WO0219605 | 3/2002 |
| WO | WO03017688 A2 | 2/2003 |
| WO | WO03034644 A1 | 4/2003 |
| WO | WO03041298 | 5/2003 |
| WO | WO03096581 A1 | 11/2003 |
| WO | WO03096598 | 11/2003 |
| WO | WO2004004269 | 1/2004 |
| WO | WO2004038984 A2 | 5/2004 |
| WO | WO2004038988 | 5/2004 |
| WO | WO2004056142 | 7/2004 |
| WO | WO2004057894 A1 | 7/2004 |
| WO | WO2004084450 | 9/2004 |
| WO | WO2004095851 | 11/2004 |
| WO | WO2004098098 | 11/2004 |
| WO | WO2004114548 A1 | 12/2004 |
| WO | WO2004114549 | 12/2004 |
| WO | WO2005015775 A1 | 2/2005 |
| WO | WO2005032001 A1 | 4/2005 |
| WO | WO2005048640 | 5/2005 |
| WO | WO2005067247 A1 | 7/2005 |
| WO | WO2005071867 | 8/2005 |
| WO | WO200588882 A1 | 9/2005 |
| WO | WO2005125139 | 12/2005 |
| WO | 2006086497 A1 | 8/2006 |

OTHER PUBLICATIONS

Hermann Rohling et al.; "Performance Comparison of Different Multiple Access Schemes for the Downlink of an OFDM Communication System", Vehicular Technology Conference, 1997, 47th IEEE, vol. 3, May 3-7, 1997, pp. 1365-1369.

International Search Report and Written Opinion—PCT/US2007/062454, International Search Authority—European Patent Office—Jun. 29, 2007.

Ojanpera, T. et al.: "Frames—Hybrid Multiple Access Technology," IEEE International Symposium on Spread Spectrum Techniques and Applications, No. 1, Sep. 22, 1996 pp. 320-324.
Taiwan Search Report—TW096106485—TIPO—Mar. 8, 2011.
Taiwan Search Report—TW096106486—TIPO—Jan. 10, 2011.
Taiwan Search Report—TW096106487—TIPO—Dec. 15, 2010.
Taiwanese Search report—096106482—TIPO—Jan. 24, 2011.
Taiwanese Search report—096106551—TIPO—Aug. 3, 2010.

* cited by examiner

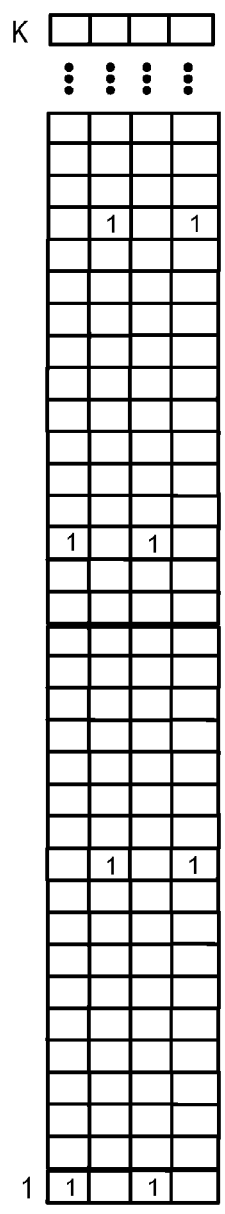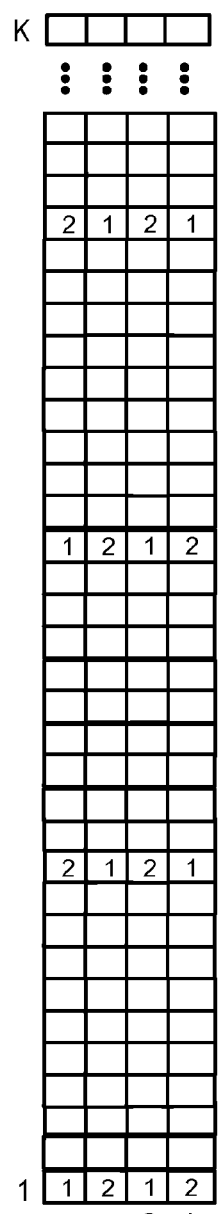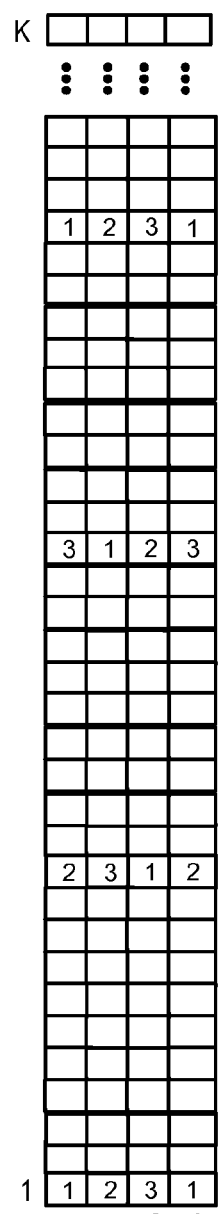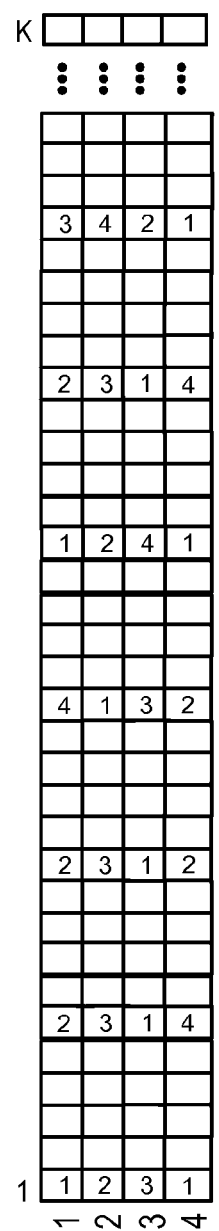
FIG. 12A — SINGLE LAYER TRANSMISSION
FIG. 12B — TWO LAYER TRANSMISSION
FIG. 12C — THREE LAYER TRANSMISSION
FIG. 12D — FOUR LAYER TRANSMISSION

FEEDBACK CHANNEL DESIGN FOR MULTIPLE-INPUT MULTIPLE-OUTPUT COMMUNICATION SYSTEMS

CLAIM OF PRIORITY UNDER 35 U.S.C. §119

The present application for patent claims priority to U.S. Provisional Patent Application Ser. No. 60/775,443, entitled Wireless Communication System and Method, filed on Feb. 21, 2006; the present application for patent also claims priority to U.S. Provisional Patent Application Ser. No. 60/775, 693, entitled DO Communication System and Method, filed on Feb. 21, 2006. Each of these Provisional patent applications is assigned to the assignee of the present application and is expressly incorporated by reference as if fully set forth herein, including all figures, tables, and claims.

BACKGROUND

1. Field

The present invention relates generally to telecommunications, and, more specifically, the invention relates to multiple-input multiple-output (MIMO) cellular communication systems.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including the "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard (occasionally referred to as simply "DO") with its revisions 0/A/B, and (6) certain other standards. The standards expressly listed above are incorporated by reference as if fully set forth herein, including annexes, appendices, and other attachments.

Data-optimized or "DO" cellular communication systems have been developed to satisfy the constantly increasing demand for wireless data services. Data-optimized systems include systems operating under the 1xEV-DO standard mentioned above. As the name implies, DO systems are optimized for data transmission (as opposed to voice transmission), and in particular such systems are optimized for downlink data transmission. Data-optimized systems need not exclude uplink data transmission, or voice transmission in either direction. It should be noted that voice may also be transmitted as data, for example, in the case of voice over internet protocol (VoIP) transmissions.

A MIMO system employs multiple ($N_T$) transmit antennae and multiple ($N_R$) receive antennae for data transmission. A MIMO channel formed by the $N_T$ transmit and $N_R$ receive antennae may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensions created by the multiple transmit and receive antennae are used.

For a full-rank MIMO channel, where $N_S = N_T \leq N_R$, an independent data stream may be transmitted from each of the $N_T$ transmit antennae. The transmitted data streams may experience different channel conditions (e.g., different fading and multipath effects) and may achieve different signal-to-interference-and-noise ratios (SINRs) for a given amount of transmit power. Moreover, if successive interference cancellation processing is used at the receiver to recover the transmitted data streams, then different SINRs may be achieved for the data streams depending on the specific order in which the data streams are recovered. Consequently, different data rates may be supported by different data streams, depending on their achieved SINRs. Since the channel conditions typically vary with time, the data rate supported by each data stream also varies with time.

The use of MIMO transmission techniques allows increased spectral efficiency, an important performance characteristic of wireless systems.

Therefore, there is a need in the art for methods, apparatus, and articles of manufacture that would allow the use of MIMO techniques in wireless systems, including cellular wireless systems. There is also a need in the art for methods, apparatus, and articles of manufacture that would allow the use of MIMO techniques while maintaining backward compatibility with legacy access terminals. There is a further need for methods, apparatus, and articles of manufacture for adapting existing data-optimized systems such as systems operating under the 1xEV-DO revisions 0, A, and B for operation employing MIMO techniques.

SUMMARY

Embodiments and variants disclosed herein address the above stated needs by providing methods, apparatus, and machine-readable articles of manufacture for inserting forward link MIMO-specific feedback information on a reverse link, and for receiving this information at a radio network.

In an embodiment, a method is provided for sending feedback from an access terminal (AT) to a base transceiver station (BTS) of a radio network configured to communicate with the access terminal using multiple-in multiple-out (MIMO) technique. The method includes the following steps: (1) determining MIMO rank information of a first forward link between the BTS and the AT; (2) determining MIMO spatial signature information of the forward link; and (3) simultaneously transmitting (i) the MIMO rank information and the MIMO spatial signature information on an In-Phase signal component of a reverse link between the BTS and the AT, and (ii) data rate control (DRC) information for a forward link on a Quadrature signal component of the reverse link.

In an embodiment, an access terminal (AT) is configured to communicate with a base transceiver station (BTS) of a radio network using multiple-in multiple-out (MIMO) technique. The access terminal includes: a receiver configured to receive forward link transmissions from the BTS; a transmitter configured to send reverse link transmissions to the BTS; a memory storing program code; and a controller coupled to the receiver, the transmitter, and the memory. The controller is configured to execute the program code to cause the AT to perform steps of (1) determining MIMO rank information of a first forward link between the BTS and the AT, (2) determining MIMO spatial signature information of the forward link, and (3) simultaneously transmitting (i) the MIMO rank information and the MIMO spatial signature information on an In-Phase signal component of a reverse link between the BTS and the AT, and (ii) data rate control (DRC) information for a forward link on a Quadrature signal component of the reverse link.

In an embodiment, a machine-readable medium has instructions embedded therein. When the instructions are executed by at least one processor of an access terminal (AT) for communicating with a base transceiver station (BTS) of a radio network configured to communicate with the access terminal using multiple-in multiple-out (MIMO) technique, the instructions cause the AT to perform the following operations: (1) determining MIMO rank information of a first forward link between the BTS and the AT; (2) determining MIMO spatial signature information of the forward link; and (3) simultaneously transmitting (i) the MIMO rank information and the MIMO spatial signature information on an In-Phase signal component of a reverse link between the BTS and the AT, and (ii) data rate control (DRC) information for a forward link on a Quadrature signal component of the reverse link.

In an embodiment, a method is provided for sending feedback from an access terminal (AT) to a base transceiver station (BTS) of a radio network configured to communicate with the access terminal using multiple-in multiple-out (MIMO) technique. The method includes these steps: (1) determining MIMO rank information of a first forward link between the BTS and the AT; (2) determining MIMO spatial signature information of the forward link; and (3) step for simultaneously transmitting to the BTS the MIMO rank information and the MIMO spatial signature on an In-Phase signal component of a reverse link between the BTS and the AT, and data rate control (DRC) information on a Quadrature component of the reverse link.

In an embodiment, a method is provided for receiving feedback from an access terminal (AT) sent to a base transceiver station (BTS) of a radio network configured to communicate with the access terminal using multiple-in multiple-out (MIMO) technique. The method includes the following steps: (1) simultaneously receiving (i) MIMO rank information of a forward link between the BTS and the AT and MIMO spatial signature information of the forward link on an In-Phase signal component of a reverse link between the BTS and the AT, and (ii) data rate control (DRC) information for the forward link on a Quadrature signal component of the reverse link; and (2) configuring the forward link in accordance with the MIMO rank information, MIMO spatial signature information, and the DRC information.

In an embodiment, a base transceiver station of a radio network is configured to communicate with an access terminal (AT) using multiple-in multiple-out (MIMO) technique. The base transceiver station includes a receiver configured to receive transmissions from the AT on a reverse link, a transmitter configured to send transmissions to the AT on a forward link, a memory storing program code, and a controller coupled to the receiver, transmitter, and the memory. The controller is configured to execute the program code to cause the base transceiver station to perform steps including: (1) receiving from the AT MIMO rank information of the forward link and MIMO spatial signature information of the forward link on an In-Phase signal component of the reverse link, (2) receiving data rate control (DRC) information for the forward link on a Quadrature signal component of the reverse link, and (3) configuring the base transceiver station to transmit to the AT on the forward link in accordance with the MIMO rank information, MIMO spatial signature information, and the DRC information.

In an embodiment, a machine-readable medium includes instructions embedded therein. When the instructions are executed by at least one processor of a base transceiver station (BTS) configured for communicating with an access terminal (AT) using multiple-in multiple-out (MIMO) technique, the instructions cause the BTS to perform operations including: (1) simultaneously receiving (i) MIMO rank information of a forward link between the BTS and the AT and MIMO spatial signature information of the forward link on an In-Phase signal component of a reverse link between the BTS and the AT, and (ii) data rate control (DRC) information for the forward link on a Quadrature signal component of the reverse link; and (2) configuring the forward link in accordance with the MIMO rank information, MIMO spatial signature information, and the DRC information.

In an embodiment, a method is provided for receiving feedback from an access terminal (AT) sent to a base transceiver station (BTS) of a radio network configured to communicate with the access terminal using multiple-in multiple-out (MIMO) technique. The method includes these steps: (1) step for simultaneously receiving (i) MIMO rank information of a forward link between the BTS and the AT and MIMO spatial signature information of the forward link on an In-Phase signal component of a reverse link between the BTS and the AT, and (ii) data rate control (DRC) information for the forward link on a Quadrature signal component of the reverse link; and (2) configuring the forward link in accordance with the MIMO rank information, MIMO spatial signature information, and the DRC information.

In an embodiment, a method is provided for sending feedback from an access terminal (AT) to a base transceiver station (BTS) of a radio network configured to communicate with the access terminal using multiple-in multiple-out (MIMO) technique. The method includes determining MIMO rank information of a first forward link between the BTS and the AT, determining MIMO spatial signature information of the forward link, and simultaneously transmitting (i) the MIMO spatial signature information on an In-Phase signal component of a reverse link between the BTS and the AT, and (ii) the MIMO rank information and data rate control (DRC) information for a forward link on a Quadrature signal component of the reverse link. In accordance with the method, the MIMO rank information is covered by a first codeword Walsh cover, the DRC information is covered by a second codeword Walsh cover, and the second codeword Walsh cover is orthogonal to the first Walsh cover.

In an embodiment, an access terminal (AT) is configured to communicate with a base transceiver station (BT) of a radio network using multiple-in multiple-out (MIMO) technique. The access terminal includes a receiver configured to receive forward link transmissions from the BTS, a transmitter configured to send reverse link transmissions to the BTS, a memory storing program code, and a controller coupled to the receiver, the transmitter, and the memory. The controller is configured to execute the program code to cause the AT to perform steps including these: (1) determining MIMO rank information of a first forward link between the BTS and the AT; (2) determining MIMO spatial signature information of the first forward link; and (3) simultaneously transmitting (i)

the MIMO spatial signature information on an In-Phase signal component of a reverse link between the BTS and the AT, and (ii) the MIMO rank information and data rate control (DRC) information for a forward link on a Quadrature signal component of the reverse link. In accordance with the method, the MIMO rank information is covered by a first codeword Walsh cover, the DRC information is covered by a second codeword Walsh cover, and the second codeword Walsh cover is orthogonal to the first Walsh cover.

In an embodiment, a machine-readable medium stores instructions embedded therein. When the instructions are executed by at least one processor of an access terminal (AT) for communicating with a base transceiver station (BTS) of a radio network configured to communicate with the AT using multiple-in multiple-out (MIMO) technique, the instructions cause the AT to perform the following operations: (1) determining MIMO rank information of a first forward link between the BTS and the AT; (2) determining MIMO spatial signature information of the forward link; and (3) simultaneously transmitting (i) the MIMO spatial signature information on an In-Phase signal component of a reverse link between the BTS and the AT, and (ii) the MIMO rank information and data rate control (DRC) information for a forward link on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

In an embodiment, a method is provided for sending feedback from an access terminal (AT) to a base transceiver station (BTS) of a radio network configured to communicate with the AT using multiple-in multiple-out (MIMO) technique. The method includes: (1) determining MIMO rank information of a first forward link between the BTS and the AT; (2) determining MIMO spatial signature information of the forward link; and (3) step for simultaneously transmitting to the BTS the MIMO spatial signature information on an In-Phase signal component of a reverse link between the BTS and the AT, and data rate control (DRC) information and the MIMO rank information on a Quadrature signal component of the reverse link. In accordance with the methods, the MIMO rank information is covered by a first codeword Walsh cover, the DRC information is covered by a second codeword Walsh cover, and the second codeword Walsh cover is orthogonal to the first Walsh cover.

In an embodiment, a method is provided for processing feedback sent from an access terminal (AT) to a base transceiver station (BTS) of a radio network configured to communicate with the AT using multiple-in multiple-out (MIMO) technique. The method includes (1) simultaneously receiving (i) MIMO rank information and data rate control (DRC) information of a forward link between the BTS and the AT on a Quadrature signal component of a reverse link between the BTS and the AT, and (ii) MIMO spatial signature information for the forward link on an In-Phase signal component of the reverse link; and (2) configuring the forward link in accordance with the MIMO rank information, MIMO spatial signature information, and the DRC information.

In an embodiment, a base transceiver station of a radio network is configured to communicate with an access terminal (AT) using multiple-in multiple-out (MIMO) technique. The base transceiver station includes: a receiver configured to receive transmissions from the AT on a reverse link; a transmitter configured to send transmissions to the AT on a forward link; a memory storing program code; and a controller coupled to the receiver, the transmitter, and the memory. The controller is configured to execute the program code to cause the base transceiver station to perform these steps: (1) simultaneously receiving (i) MIMO rank information and data rate control (DRC) information of the forward link between the BTS and the AT on a Quadrature signal component of the reverse link between the BTS and the AT, and (ii) MIMO spatial signature information for the forward link on an In-Phase signal component of the reverse link; and (2) configuring the forward link in accordance with the MIMO rank information, MIMO spatial signature information, and the DRC information.

In an embodiment, a machine-readable medium includes instructions embedded therein. When the instructions are executed by at least one processor of a base transceiver station (BTS) configured for communicating with an access terminal (AT) using multiple-in multiple-out (MIMO) technique, the instructions cause the BTS to perform operations including: (1) simultaneously receiving (i) MIMO rank information and data rate control (DRC) information of a forward link between the BTS and the AT on a Quadrature signal component of a reverse link between the BTS and the AT, and (ii) MIMO spatial signature information for the forward link on an In-Phase signal component of the reverse link; and (2) configuring the forward link in accordance with the MIMO rank information, MIMO spatial signature information, and the DRC information.

In an embodiment, a method is provided for receiving feedback sent from an access terminal (AT) to a base transceiver station (BTS) of a radio network configured to communicate with the access terminal using multiple-in multiple-out (MIMO) technique. The method includes the following steps: (1) step for simultaneously receiving (i) MIMO rank information and data rate control (DRC) information of a forward link between the BTS and the AT on a Quadrature signal component of a reverse link between the BTS and the AT, and (ii) MIMO spatial signature information for the forward link on an In-Phase signal component of the reverse link; and (2) configuring the forward link in accordance with the MIMO rank information, MIMO spatial signature information, and the DRC information.

These and other embodiments and aspects of the present invention will be better understood with reference to the following description, drawings, and appended claims.

BRIEF DESCRIPTION OF THE DRAWINGS

FIGS. 12A-12D illustrate an exemplary pilot transmission scheme for a multi-antenna OFDM system.

DETAILED DESCRIPTION

Figure 1:
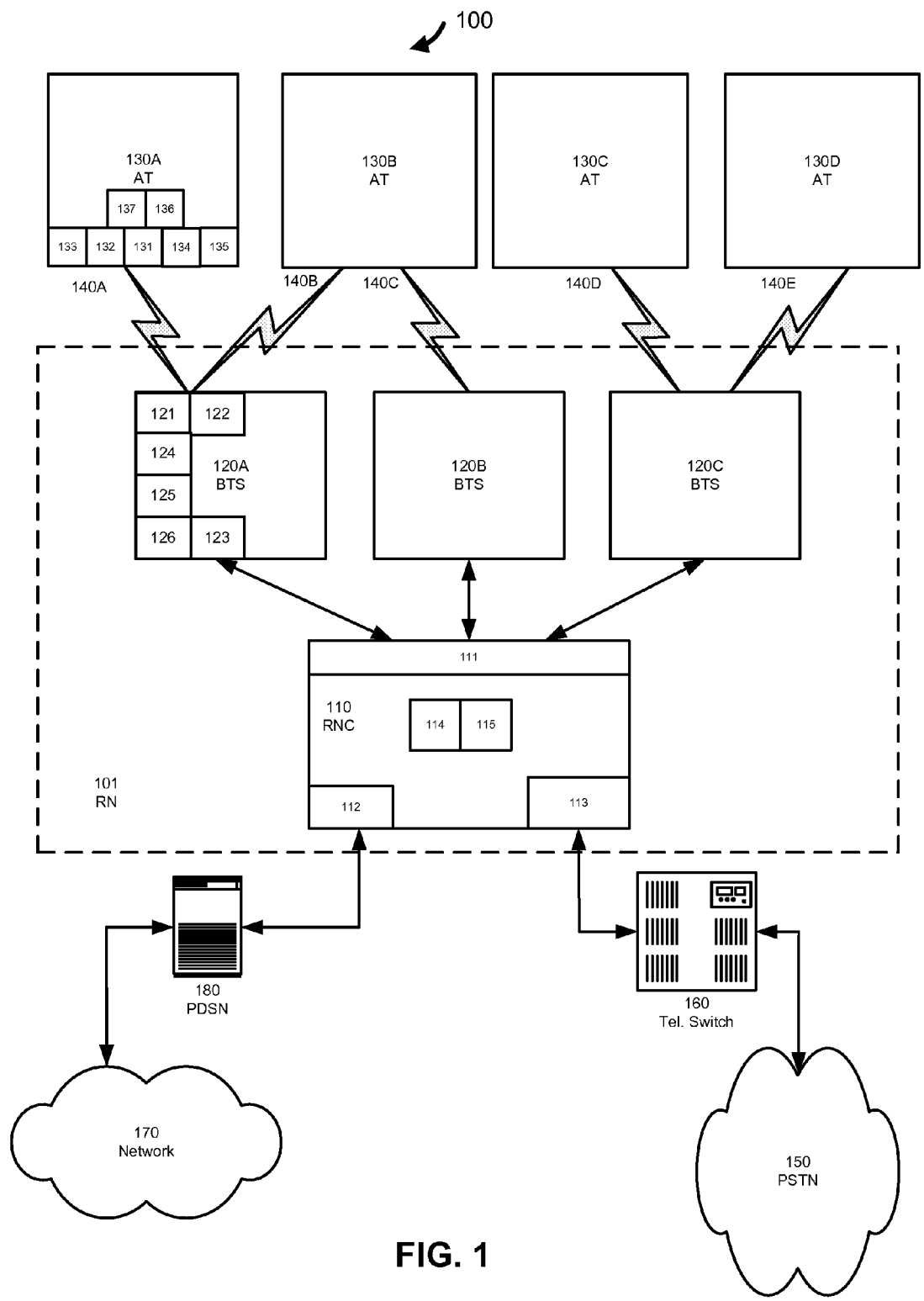
FIG. 1 illustrates selected components of a CDMA data-optimized cellular communication system configured in accordance with an embodiment of the present invention.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention.

The word "traffic" generally refers to payload or user traffic, such as data other than air interface control information and pilots. For reverse link, data traffic is generally generated by an application, such a vocoder of a VoIP application.

A "link" (e.g., a forward or reverse link) may be a MIMO layer or another type of MIMO channel, as will be better understood after reading this document and reviewing the Figures.

An access terminal, also referred to as AT, subscriber station, user equipment, UE, mobile terminal, or MT, may be mobile or stationary, and may communicate with one or more base transceiver stations. An access terminal may be any of a number of types of devices, including but not limited to PC card, external or internal modem, wireless telephone, and personal digital assistant (PDA) with wireless communication capability. An access terminal transmits and receives data packets to or from a radio network controller through one or more base transceiver stations.

Base transceiver stations and base station controllers are parts of a network referred to as radio network, RN, access network, or AN. A radio network may be a UTRAN or UMTS Terrestrial Radio Access Network. The radio network may transport voice and data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementations, a base transceiver station may be referred to by other names, including Node-B, base station system, BSS, and simply base station. Similarly, a base station controller may be referred to by other names, including radio network controller, RNC, mobile switching center, or serving GPRS support node.

The scope of the invention extends to these and similar wireless communication system components.

FIG. 1 illustrates selected components of a wireless communication radio network 101 configured to operate in accordance with various embodiments and variants described herein. The network 101 may include a radio network controller 110 (or several such devices) coupled to one or more base transceiver stations 120, each with one or more sectors. The base transceiver stations 120 receive reverse link wireless communication signals from and transmit forward link wireless communication signals to one or more access terminals 130. Each base transceiver station 120 may include a transmitter chain and a receiver chain, with each chain including a plurality of components associated with signal transmission and reception, respectively, such as processors, modulators, multiplexers, demodulators, demultiplexers, encoders, decoders, interleavers, deinterleavers, and antennae.

The base transceiver stations 120 communicate with access terminals 130A, 130B, 130C, and 130D through wireless connections 140. The radio network controller 110 is coupled to a public switched telephone network 150 through a telephone switch 160, and to a packet switched network 170 through a packet data server node (PDSN) 180. Data interchange between various network elements, such as the radio network controller 110 and the packet data server node 180, may be implemented using any number of protocols, for example, the Internet Protocol (IP), an asynchronous transfer mode (ATM) protocol, T1, E1, frame relay, and other protocols.

In the illustrated embodiment, the radio network 101 is a data-optimized cellular CDMA radio network, for example, a 1xEV-DO 0/A/B radio network. The radio network 101 provides both data communication services and cellular telephone (voice) services to the access terminals 130. In alternative embodiments, the radio network may provide only data services (including VoIP and similar packetized data-based voice communications).

Multiple or even all of the access terminals 130 may be in the same cell or site, or each access terminal 130 may be in a separate cell or site.

A typical access terminal 130 includes receiver circuitry 131, transmitter circuitry 132, encoder 133, decoder 134, equalizer 135, processor 136, and memory device 137. The receiver circuitry 131 may include multiple receiver elements and receiver chains, to enable simultaneous receipt of signals through two or more antennae. Similarly, the transmitter circuitry 132 may include two or more transmitter elements and chains, to enable simultaneous transmission from two or more antennae. The antennae used for transmitting and receiving may be the same or different antennae. The receiver, transmitter, encoder, decoder, and equalizer are configured by the processor executing program code stored in the memory device. Each access terminal 130 is configured to communicate data using at least one transmission protocol, such as the wireless packet transmission protocols described in the standards mentioned above, including 1xEV-DO with its revisions. In variants, at least one of the access terminals 130 is further configured to employ MIMO techniques described throughout this document in the process of communicating with the base transceiver stations 120.

Each of the base transceiver stations 120 includes one or more wireless receivers (e.g., receivers 121 of the BTS 120A), one or more wireless transmitters (e.g., transmitters 122 of the BTS 120A), radio network controller interface (e.g., interface 123), a memory (e.g., memory 124), a processor (e.g., processor 125), and encoder/decoder circuitry (e.g., encoder/decoder circuitry 126). As in the case of the access terminals 130, the BTS receivers may include multiple receiver elements and chains, and the BTS transmitters may include multiple transmitter elements and chains, thus enabling reception and transmission through multiple antennae of the BTS 120. The receivers, transmitters, and other components of each base transceiver station are configured by the station's processor operating under control of the program code stored in the BTS's memory, to establish forward and reverse links with the access terminals 130, in order to send packets to and receive packets from the access terminals 130. In the case of data services, for example, the base transceiver stations 120 may receive forward link data packets from the packet switched network 170 through the packet data server node 180 and through the radio network controller 110, and transmit these packets to the access terminals 130. The base transceiver stations 120 may receive reverse link data packets that originate at the access terminals 130, and forward these packets to the packet switched network 170 through the radio network controller 110 and the packet data server node 180. In the case of telephone (voice) services, the base transceiver stations 120 may receive forward link data packets from the telephone network 150 through the telephone switch 160 and through the radio network controller 110, and transmit these packets to the access terminals 130. Voice packets originating at the access terminals 130 may be received at the base transceiver stations 120 and forwarded to the telephone network 150 via the radio network controller 110 and the telephone switch 160.

In some embodiments, the transmitters, receivers, and other components of each BTS may each have separate processors.

The radio network controller 110 includes an interface 111 to the base transceiver stations 120, an interface 112 to the packet data server node 180, and an interface 113 to the telephone switch 160. The interfaces 111, 112, and 113 operate under control of one or more processors 114 executing program code stored in one or more memory devices 115.

A person skilled in the art would recognize, after perusal of this document, that alternative embodiments in accordance with aspects of the invention need not be limited to any particular number of public switched telephone networks, packet switched networks, base station controllers, base transceiver stations, access terminals, or other network components. For example, a lesser or a greater number of base transceiver stations, radio network controllers, and access terminals may be included in some embodiments. Furthermore, the radio network 101 may connect the access terminals 130 to one or more additional communication networks, for example, a second wireless communication network having a number of wireless access terminals.

In some variants, the radio network 101 may employ orthogonal frequency division multiplexing (OFDM), which effectively partitions the operating frequency band into a number of ($N_T$) frequency sub-channels (i.e., frequency bins). During each time slot (which is a particular time interval that may be dependent on the bandwidth of the frequency sub-channel), a modulation symbol may be transmitted on each of the $N_F$ frequency sub-channels. OFDM operation is not a requirement of the invention.

In variants, the radio network and one or more of the access terminals are configured to employ MIMO techniques described throughout this document in the process of communicating with each other.

Figure 2:
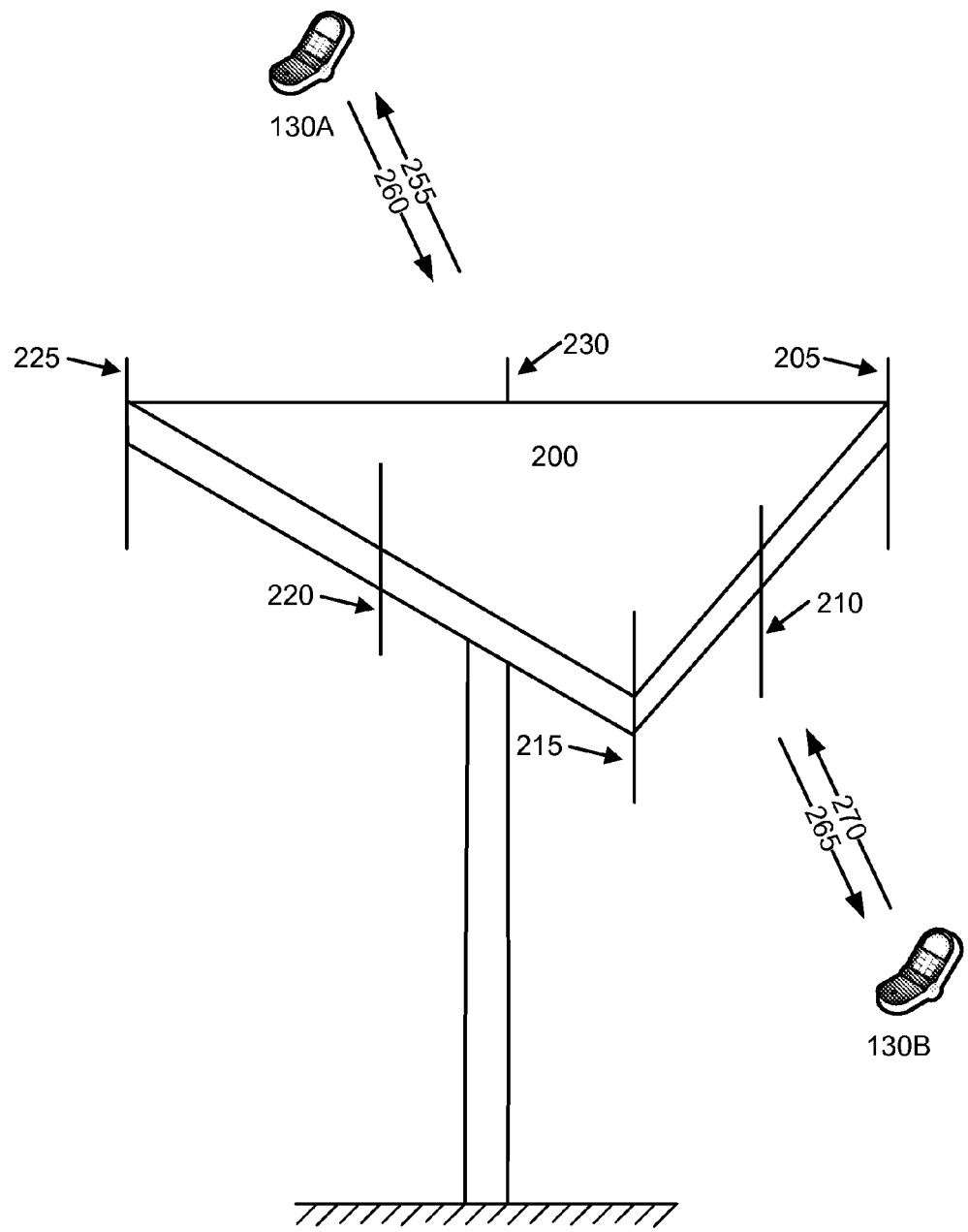
FIG. 2 illustrates selected components of an exemplary antenna system of a base transceiver station of the system of FIG. 1.

FIG. 2 illustrates selected components of an exemplary antenna system 200 of one or more of the base transceiver stations 120 of the radio network of FIG. 1. The antenna system 200 has three antenna groups. The first antenna group includes antennae 205 and 210, a second antenna group includes antennae 215 and 220, and a third antenna group includes antennae 225 and 230. Only two antennae are shown for each of the antenna groups, but as a person skilled in the art would recognize after perusal of this document, a different number of antennae may be included in each of the antenna groups. Additionally, a different number of antenna groups may be present. As shown in FIG. 2, the access terminal 130A is in communication with the antennae 225 and 230 over a forward link 255 and a reverse link 260; the access terminal 130B is in communication with antennae 205 and 210 over a forward link 265 and a reverse link 270. The links 255 and 260 are parts of one of the wireless connections 140 of FIG. 1, for example, 140A; the links 265 and 270 are parts of another wireless connection of FIG. 1, for example 140B.

Each antenna group and/or the area in which the group is designated to communicate with the access terminals 130 may be referred to as a "sector" of the corresponding base transceiver station 120. In communication over the forward links 255 and 265, the transmitting antennae of the base transceiver station 120 may use, for example, beam-forming techniques in order to improve the signal-to-noise ratio of the forward links for the different access terminals 130. Additionally, a base transceiver station using beam-forming to transmit to access terminals scattered randomly throughout its coverage area causes less interference to mobile devices in neighboring cells and sectors than a base transceiver station transmitting through a single antenna to all access terminals in its coverage area. It should be noted, however, that MIMO communications in accordance with some variants are not limited to beam-forming techniques.

In MIMO communications, a "spatial signature" for a receiver is given by a channel response vector (for each frequency band) between the $N_T$ transmit antennae and each of the $N_R$ receive antennae at the particular receiver. (It should be understood that an access terminal 130 may be a receiver or a transmitter, depending on the direction of the communication; similarly, a base transceiver station may also be a receiver or a transmitter.) In other words, a spatial signature is a radio frequency characterization of the propagation paths between the transmit and receive antennae. A "rank" is the number of eigen-modes in the channel with non-zero energy. The rank determines how many data streams or signals can actually be sent from a MIMO system transmitter and separated at the MIMO system receiver. Beam-forming is a special case in which rank is equal to one.

For the forward link transmissions, the access terminals 130 may estimate the various spatial physical channels, derive spatial signatures and ranks from the channel estimates, and report the spatial signatures and ranks to the base transceiver station 120 through existing control channels on the reverse links. The base transceiver station 120 may then process the spatial signatures and ranks received from the access terminals 130 to select access terminals 130 for data transmission, and to derive mutually orthogonal steering vectors for each of the independent data streams to be transmitted to the selected terminals. Additionally, on the reverse link the base transceiver station 120 may derive the spatial signatures of the different access terminals 130, process these signatures to schedule terminals for data transmission, and further process the transmissions from the scheduled access terminals 130 to demodulate separately each transmission.

A way is needed to report spatial signature and rank information from the access terminals 130 to the base transceiver stations 120. This document describes a structure incorporating in an existing DO system support for the reporting of forward link spatial signature and rank information on the reverse link. In particular, this document describes enhancements of existing 1xEV-DO systems that allow access terminals to provide MIMO spatial signature and rank components on the reverse link, while preserving compatibility with legacy 1xEV-DO access terminals. In these systems, the existing 1xEV-DO reverse link feedback mechanisms are used to transmit the spatial signature and rank components to the base transceiver station 120 of the radio network.

Figure 3:
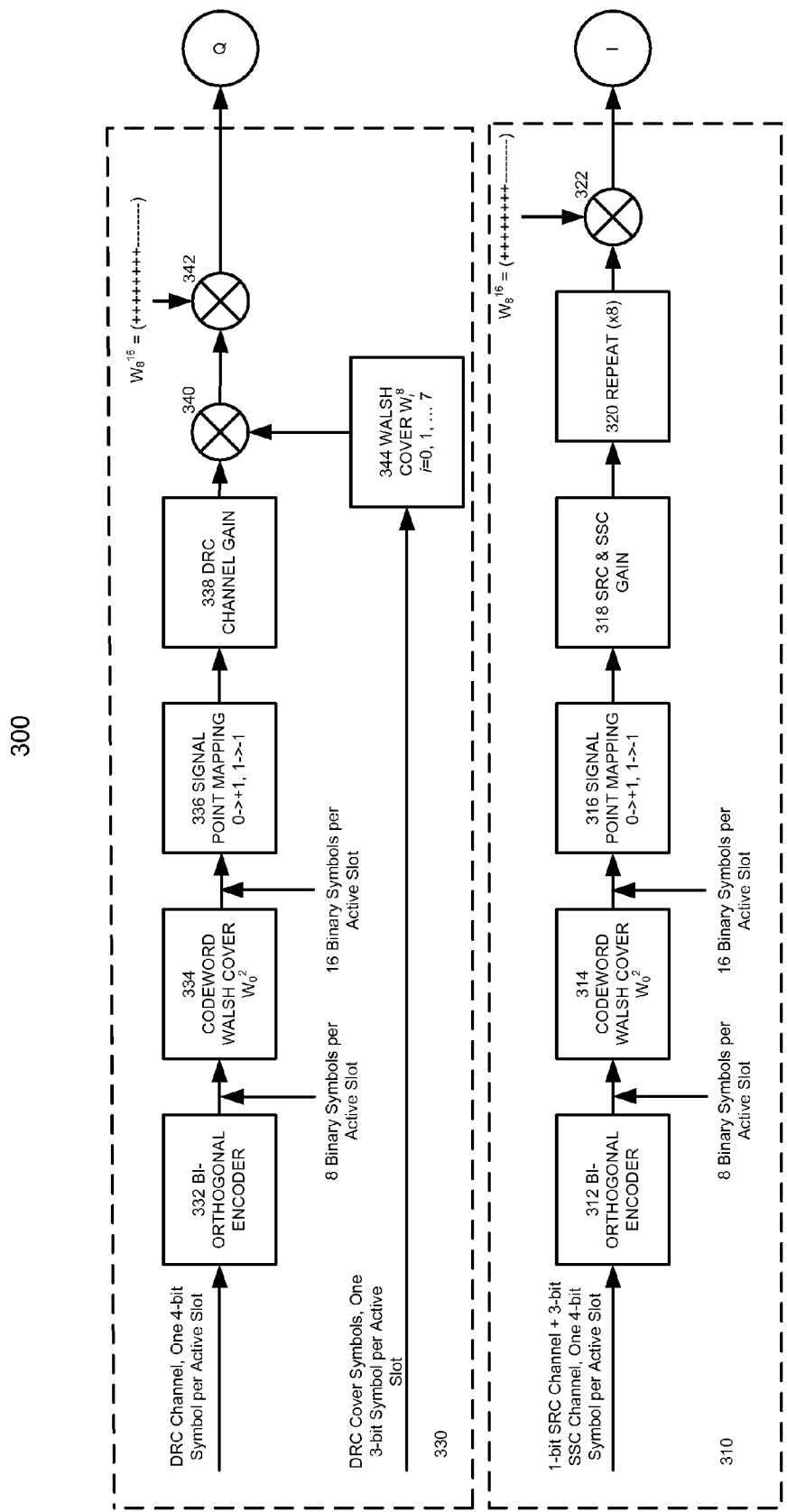
FIG. 3 illustrates selected blocks of a portion of a transmitter configured to encode and modulate spatial signature and rank information for transmission on a reverse link, in accordance with an embodiment of the present invention.

FIG. 3 illustrates selected blocks of a portion of a transmitter 300 of the access terminal 130 configured to encode and modulate spatial signature and rank information for transmission to the base transceiver station 120 on a reverse link. Here, three bits are used for the spatial signature and one bit is used for the rank of forward link MIMO, corresponding to the case of two transmit antennae in the serving sector of the base transceiver station 120.

Two branches are shown in FIG. 3: (1) an In-Phase or I-Branch 310, and (2) a Quadrature or Q-Branch 330. The I-Branch 310 includes a Bi-Orthogonal Encoder 312, a Codeword Walsh Cover ($W_0^2$) component 314, a Signal Point Mapper 316, an SRC and SSC Gain element 318, a Repeater (×8) 320, and a Modulator 322. The Q-Branch 330 includes a Bi-Orthogonal Encoder 332, a Codeword Walsh Cover ($W_0^2$) component 334, a Signal Point Mapper 336, a DRC Channel Gain element 338, Modulators 340 and 342, and another Walsh Cover $W^8_{i=0, 1, \ldots, 7}$ component 344. All component blocks of the I-Branch 310 and the Q-Branch 330 may be arranged as shown in FIG. 3.

Spreading is applied to the physical transmission channels. The spreading includes channelization and scrambling. Channelization transforms every data symbol into a number of chips, thus increasing the bandwidth of the signal. The number of chips per data symbol is called the Spreading Factor or SF. In the scrambling operation, a scrambling code is applied to the spread signal. With the channelization, data symbols on the I-Branch 310 and the Q-Branch 330 are independently multiplied with an Orthogonal Variable Spreading Factor (OVSF) code. The resulting signals on the I-Branch 310 and the Q-Branch 330 are further multiplied by complex-valued scrambling code, where I and Q denote real and imaginary parts, respectively.

The structure of the Q-Branch 310 used for data rate control (DRC) feedback on the reverse link may be similar or identical to the corresponding structure of the 1xEV-DO revision 0. In DO revision B, the ability to transmit four more bits of DRC (for another CDMA channel) on the I-Branch was added. (Thus, in DO revision B DRCs for up to four forward CDMA channels could be transmitted on one reverse link.) The Q-Branch 310 and the I-Branch 330 have now been additionally modified to carry the spatial rank information on the spatial rank channel (SRC) and the spatial signature information on the spatial signature channel (SSC). Thus, in the embodiment of FIG. 3, one-bit spatial rank channel and three-bit spatial signature channel replace the four-bit DRC at the input to the I-Branch of 1xEV-DO system. The Bi-Orthogonal Encoder 312 now receives four SSC and SRC bits, instead of the same number of rate control DRC bits. If the replaced DRC bits are needed, for example, for multicarrier operation, they may be transmitted on another long code mask.

Note that three bits of SSC correspond to eight (or possibly fewer) distinct spatial signatures. The distinct spatial signatures may be predefined for the system or for each particular sector. In some variants, spatial signatures may be negotiated during connection setup between the particular access terminal and the particular base transceiver station. In some variants, 5, 6, or 7 distinct predefined or negotiated spatial signatures are used. The number of the distinct spatial signatures may also be negotiated during connection setup.

Figure 4:
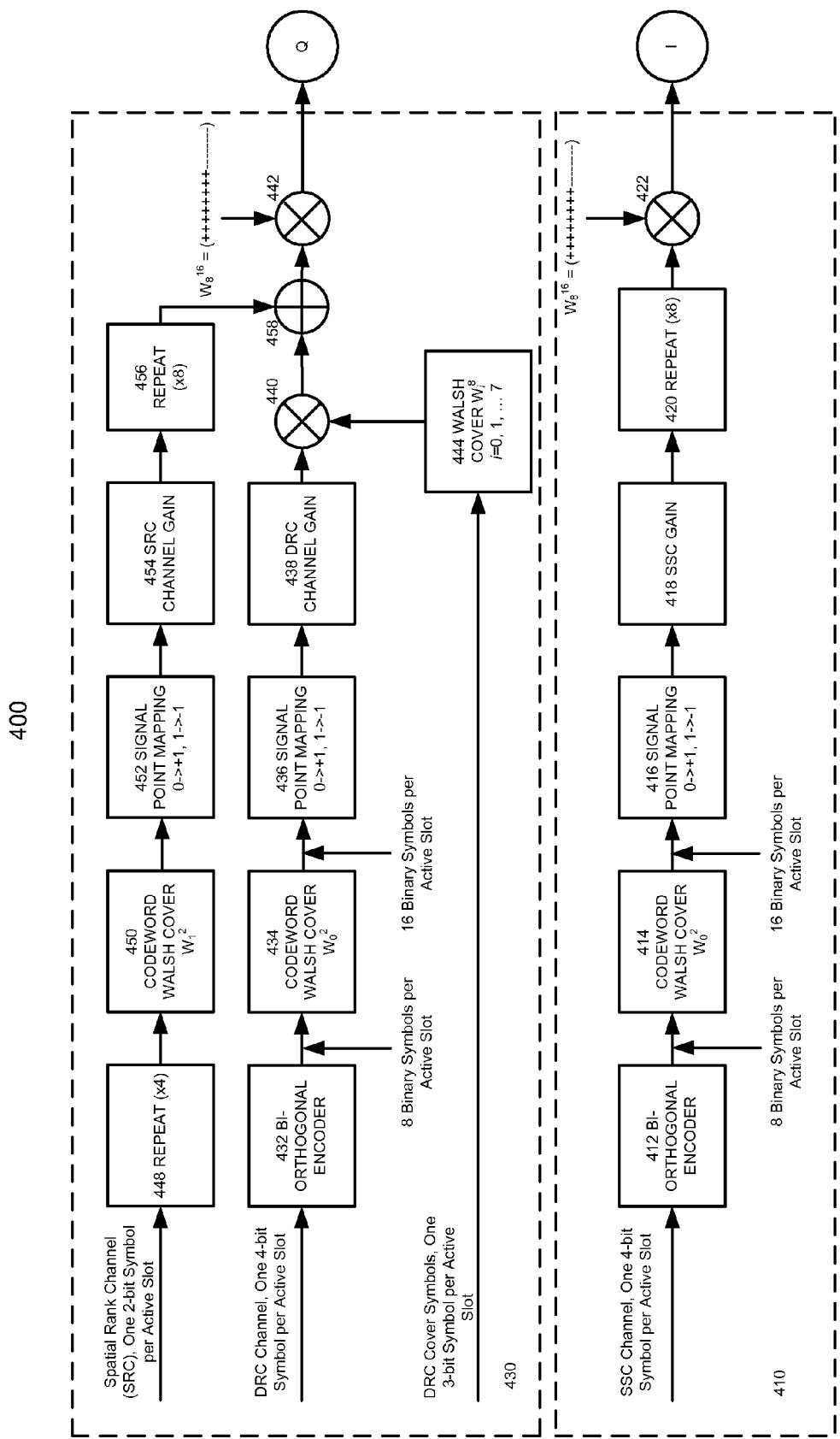
FIG. 4 illustrates selected blocks of a portion of another transmitter configured to encode and modulate spatial signature and rank information for transmission on a reverse link, in accordance with an embodiment of the present invention.

In the MIMO case with four transmit antennae, the number of bits for both the spatial rank channel and the spatial signature channel may increase. For example, the spatial signature my use four bits (instead of three), and the spatial rank may use two bits (instead of one). FIG. 4 illustrates selected blocks of a portion of a reverse link transmitter 400 of the access terminal 130 configured to encode and modulate four-bit spatial signature and two-spatial bit rank information for the case of four transmit antennae.

I-Branch 410 of FIG. 4 may be similar or identical to the I-Branch 310 of FIG. 3. As illustrated, it includes a Bi-Orthogonal Encoder 412, a Codeword Walsh Cover ($W_0^2$) component 414, a Signal Point Mapper 416, an SSC Gain element 418, a Repeater (×8) 420, and a Modulator 422. Q-Branch 430 includes a number of components similar or identical to analogously-numbered components of the Q-Branch 330 of FIG. 3: a Bi-Orthogonal Encoder 432, a Codeword Walsh Cover ($W_0^2$) component 434, a Signal Point Mapper 436, a DRC Channel Gain element 438, Modulators 440 and 442, and another Walsh Cover ($W_i^8$) component 444. Additionally, the Q-Branch 430 includes a Repeater (×4) 448, a Codeword Walsh Cover ($W_1^2$) component 450, a Signal Point Mapper 452, an SRC (Spatial Rank Channel) Gain element 454, a Repeater (×8) 456, and an adder 458. All component blocks of the I-Branch 410 and the Q-Branch 430 may be arranged in the configuration shown in FIG. 4.

As shown in FIG. 4, a four-bit SSC symbol is input into the I-Branch 410, instead of the four-bit DRC of DO revision B. The additional DRC, if needed for another forward CDMA channel, may be transmitted on another long code mask. On the Q-Branch 430, a two-bit SRC symbol is sent together with a four-bit DRC symbol. The SRC and DRC are sent using different orthogonal codeword Walsh covers. For example, the SRC may be sent with the $W_1^2$ Walsh cover, and the DRC may be sent with the $W_0^2$ Walsh cover. Since the two Walsh covers are different, the SRC and DRC can be distinguished at the base transceiver station 120. This transmission mechanism is compatible with DO revision B.

Note that here four bits of SSC correspond to sixteen (or possibly fewer) distinct spatial signatures. As in the previous case of three-bit SSC, the distinct spatial signatures may be predefined for the system, for each particular sector, or negotiated during connection setup. In some variants, 9, 10, 11, 12, 13, 14, or 15 distinct predefined or negotiated spatial signatures are used. The number of the distinct spatial signatures may also be negotiated during connection setup.

The Repeater 448 expands the two bits of the SRC to an eight-bit size, by repeating the two bit SRC four times (×4).

Figure 5:
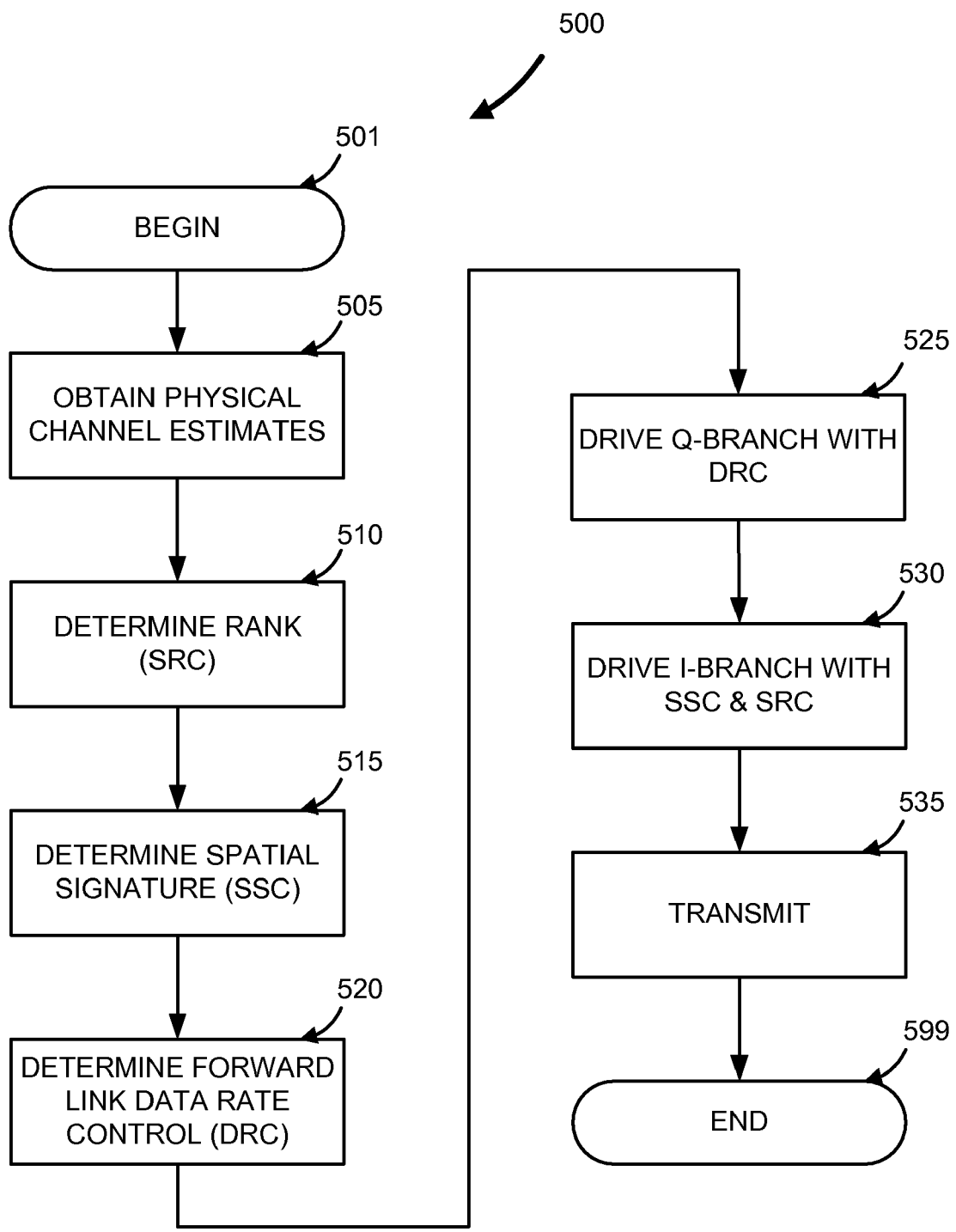
FIG. 5 illustrates selected steps of an exemplary process performed at an access terminal configured in accordance with the embodiment of FIG. 3.

FIG. 5 illustrates selected steps of an exemplary process 500 performed at an access terminal in accordance with the embodiment of FIG. 3.

At a flow point 501, the access terminal is in MIMO communication with a base transceiver station of a radio network.

At step 505, the access terminal estimates the various spatial physical paths between the multiple transmit antennae of the base transceiver station and the multiple receive antennae of the terminal.

At step 510, the access terminal determines or selects a one-bit MIMO rank for the forward link, based on the estimates.

At step 515, the access terminal determines or selects a three-bit spatial signature identifier, based on the estimates.

At step 520, the access terminal determines, based on the estimates, the appropriate forward link rate control, i.e., the DRC.

At step 525, the access terminal inputs the DRC into the Q-Branch of its transmitter.

At step 530, the access terminal inputs a one-bit spatial rank and three-bit spatial signature into the I-Branch of its transmitter.

At step 535, the access terminal transmits the active slot with the Q-Branch and I-Branch outputs carrying the DRC, rank, and spatial signature information/values.

At flow point 599, the process is complete and the access terminal is ready to repeat it for the next active slot.

The base transceiver station receives the slot transmitted by the access terminal, recovers the DRC information from the Quadrature signal component of the received slot, and recovers the spatial signature and rank information from the In-Phase signal component of the received slot. The base transceiver station then configures itself for MIMO transmission in accordance with the received DRC, SRC, and SSC.

Figure 6:
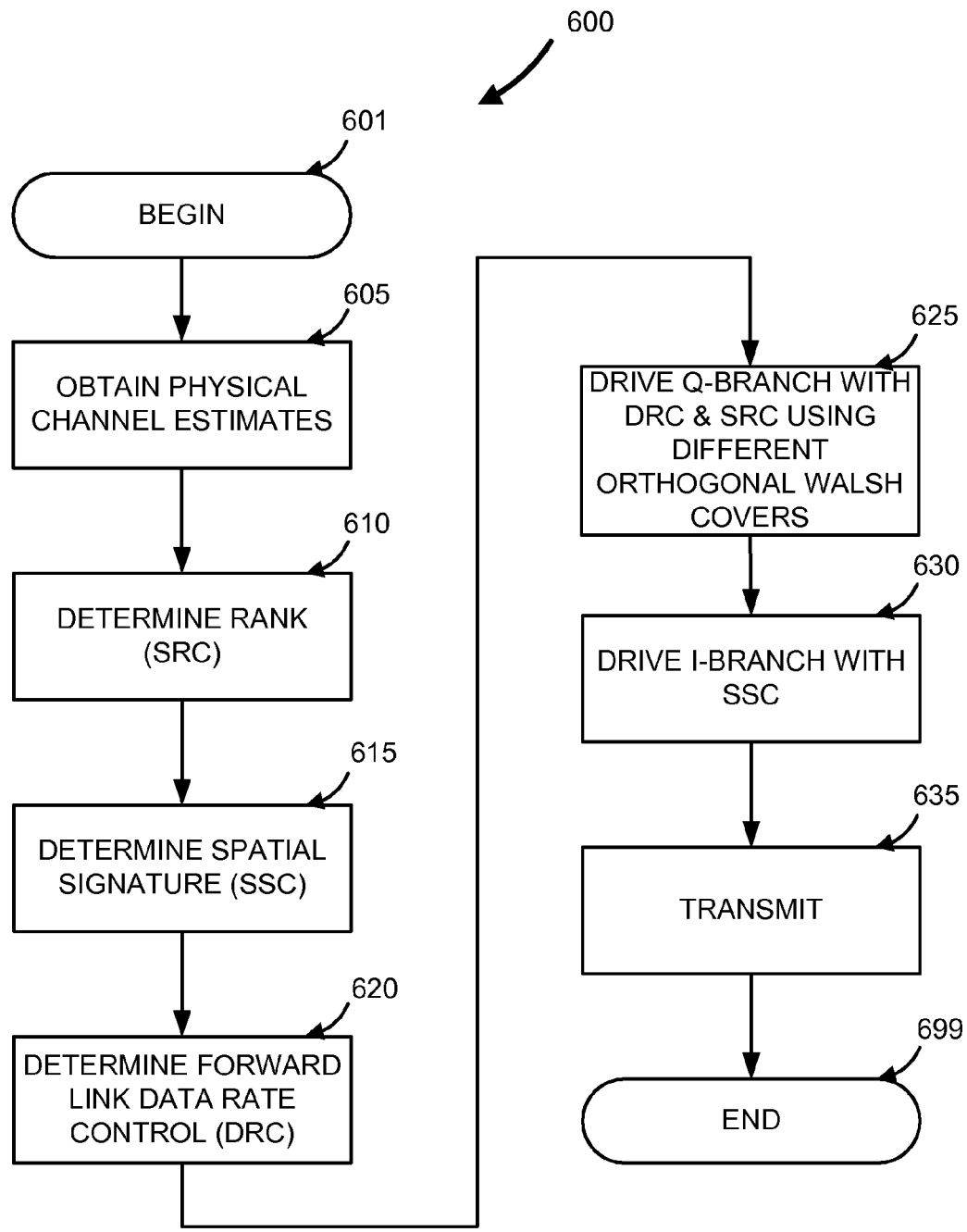
FIG. 6 illustrates selected steps of an exemplary process performed at an access terminal configured in accordance with the embodiment of FIG. 4.

FIG. 6 illustrates selected steps of an exemplary process 600 performed at an access terminal in accordance with the embodiment of FIG. 4.

At a flow point 601, the access terminal is in MIMO communication with a base transceiver station of a radio network.

At step 605, the access terminal estimates the various spatial physical paths between the multiple transmit antennae of the base transceiver station and the multiple receive antennae of the terminal.

At step 610, the access terminal determines or selects a two-bit MIMO rank for the forward link, based on the estimates.

At step 615, the access terminal determines or selects a four-bit spatial signature identifier, based on the estimates.

At step 620, the access terminal determines the appropriate DRC, based on the estimates.

At step 625, the access terminal inputs the DRC and the two-bit spatial rank into the Q-Branch of its transmitter. The DRC and the spatial rank are covered by different orthogonal Walsh codes, so that they can be separately decovered and distinguished at the base transceiver station.

At step 630, the access terminal inputs a spatial signature into the I-Branch of its transmitter.

At step 635, the access terminal transmits the active slot with the Q-Branch and I-Branch outputs carrying the DRC, rank, and spatial signature information/values.

At flow point 699, the process is complete and the access terminal is ready to repeat it for the next active slot.

The base transceiver station receives the slot transmitted by the access terminal, recovers the DRC and rank information (SRC) from the Quadrature signal component of the received slot, and recovers the spatial signature information (SSC) from the In-Phase component of the received slot. The base transceiver station then configures itself for MIMO transmission in accordance with the received DRC, SRC, and SSC.

Note that the DRC transmitted on the Q-Branch may relate to the same or to a different MIMO forward link/channel as the SSC and the SRC transmitted concurrently.

A few words describing the DO waveforms and adaptation of DO to MIMO (or MIMO to DO), and particularly regarding the forward link MIMO DO structure, may be useful for enhancing the reader's understanding of the topics discussed in this disclosure.

MIMO design has two modes of operation—single code word (SCW) mode and multiple-code word (MCW) mode. In the MCW mode, the transmitter may encode the data transmitted on each spatial layer (channel, link) independently, possibly with different rates. The receiver may employ a successive interference cancellation (SIC) algorithm, which works as follows. First, decode the first layer, and then subtract its contribution from the received signal after re-encoding and multiplying the encoded first layer with an "estimated channel," then decode the second layer, and so on with due alteration of the details. This "onion-peeling" approach means that each successively decoded layer sees increasing signal-to-noise ratio (SNR) and hence can support higher rates. In the absence of error-propagation, MCW design with SIC achieves greater capacity.

Figure 7:
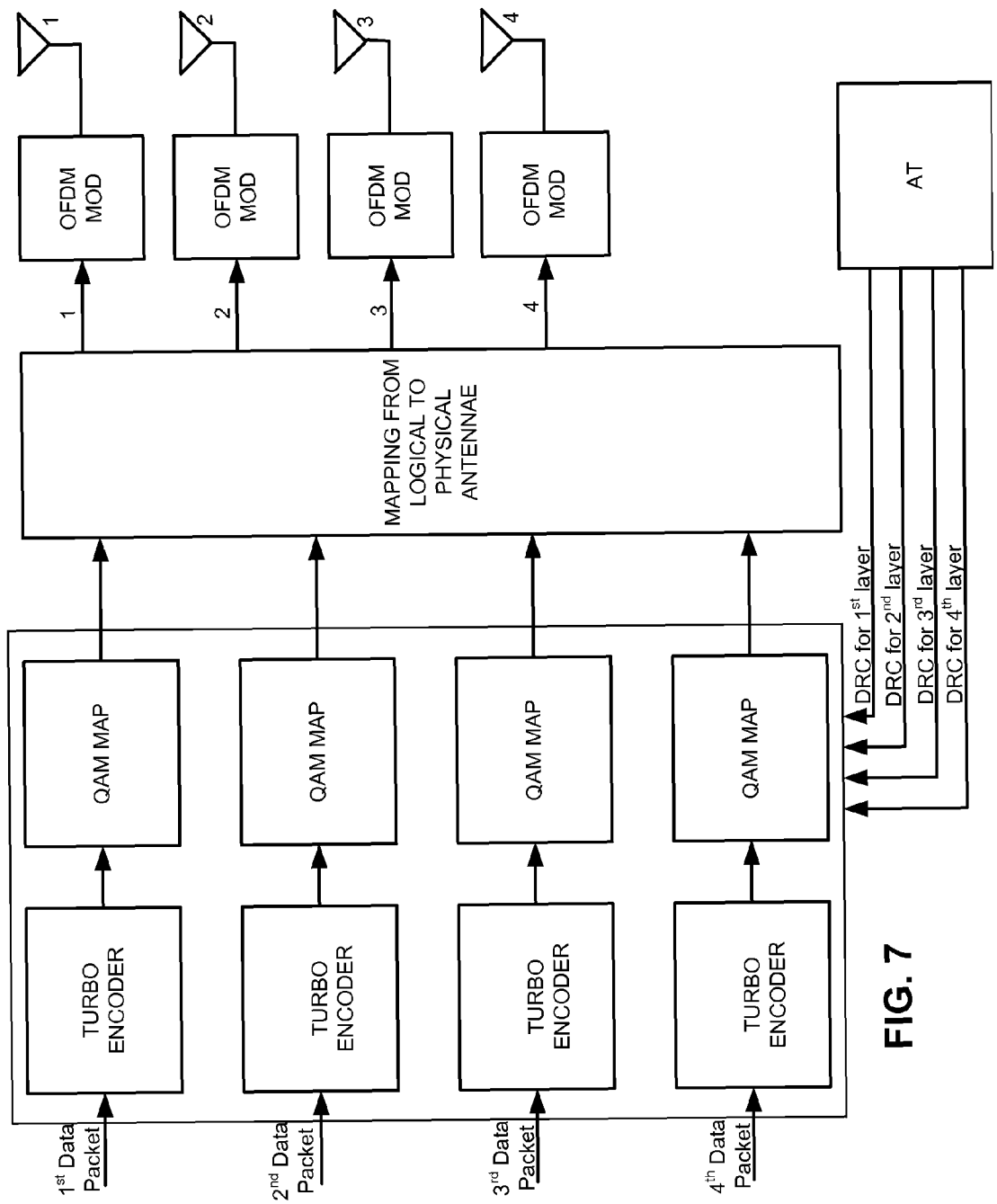
FIG. 7 illustrates selected blocks of a base transceiver station for multiple codeword multiple-input multiple-output design.

FIG. 7 shows selected blocks of an exemplary BTS design for MCW MIMO. In this design, one DRC value feedback is provided per spatial layer, and common acknowledgement stream is used, i.e., ACK until all layers decode.

In the SCW mode design, the transmitter may encode the data transmitted on each spatial layer with "identical data rates." The receiver may employ a low complexity linear receiver design such as a Minimum Mean Square Solution (MMSE) or Zero Frequency (ZF) receiver design, or non-linear receiver designs such as QRM, for each tone.

Figure 8:
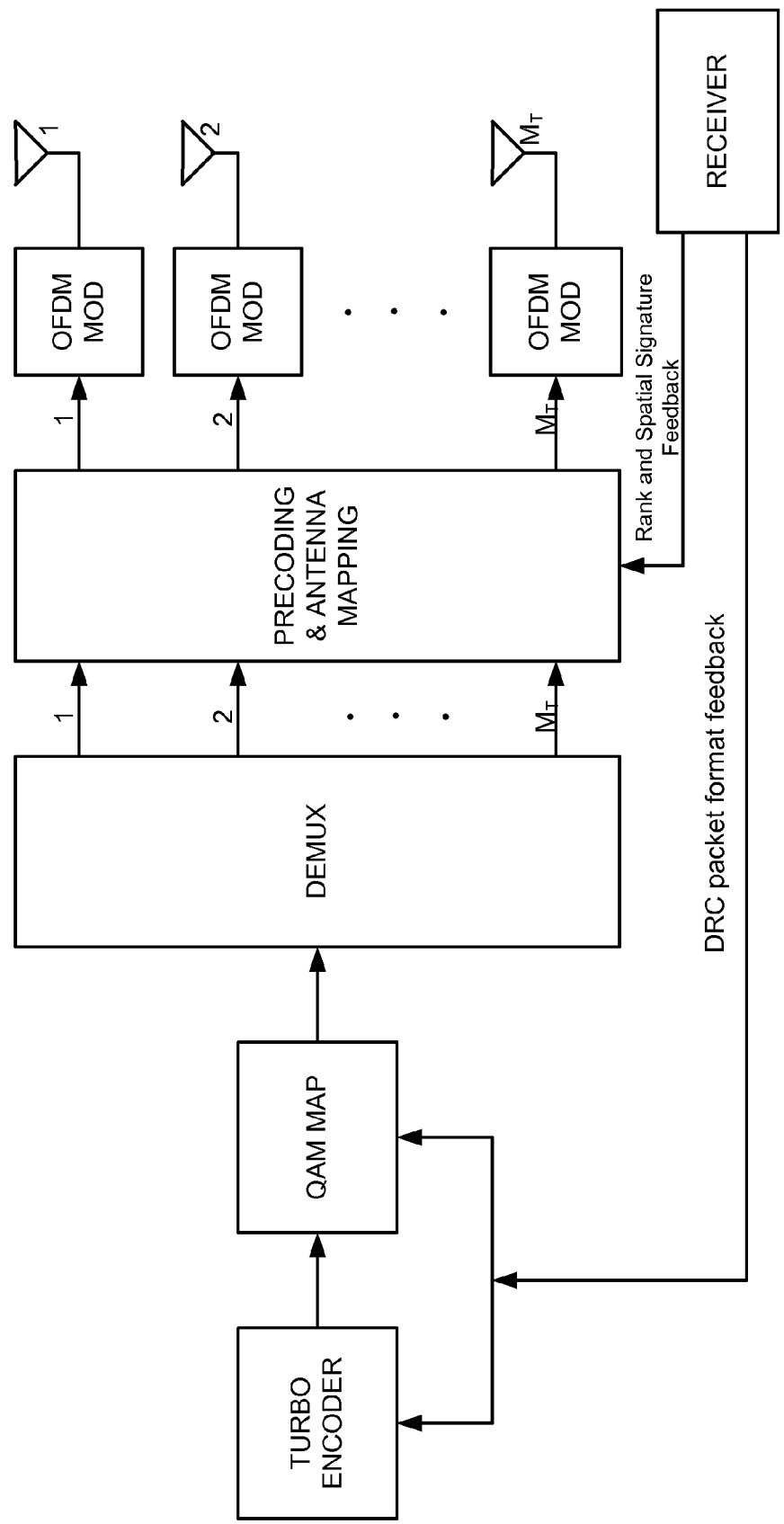
FIG. 8 illustrates selected blocks of a base transceiver station for single codeword multiple-input multiple-output design with precoding and orthogonal frequency division multiplexing.

In MIMO SCW mode, a single packet may be encoded and sent through selected transmit antennae or a number of spatial beams that are determined by the rank, which is provided by the access terminal on the reverse link. A single hybrid ARQ state machine and DRC feedback may be used as in DO Revision B. When MIMO SCW with preceding is used, spatial signatures are sent to the radio network using predefined codebook of unitary matrices. The access terminal selects the preferred beam pattern(s) for the forward link based on common spatial pilots and sends an identifier of the pattern to the radio network. (As discussed above, only the number identifying the particular spatial signature then is transmitted to the BTS.) Note that preceding with the rank equal to 1 is transmit beamforming. Cyclic delay diversity and antenna selection can be realized through codebook design. FIG. 8 shows selected blocks of an exemplary BTS design for SCW MIMO with precoding and OFDM.

As noted above, OFDM operation is not a requirement of the invention. It may, however, be desirable to use OFDM and/or single-carrier frequency division multiplexing (SC-FDM) for data sent in the traffic segments of slots. OFDM and SC-FDM partition the available bandwidth into multiple orthogonal subcarriers, which are also referred to as tones, bins and by similar appellations. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support MIMO and SDMA, which may be applied independently on each subcarrier and may thus provide good performance in a frequency selective channel.

It may be desirable to support OFDM while retaining backward compatibility with DO Revisions 0, A and B. In DO, the pilot and MAC segments may be demodulated by all active terminals at all times, whereas the traffic segments may be demodulated by only the terminals being served. Hence, backward compatibility may be achieved by retaining the pilot and MAC segments and modifying the traffic segments. OFDM data may be sent in a DO waveform by replacing the CDM data in a given 400-chip traffic segment with one or more OFDM symbols having a total duration of 400 chips or less.

Figure 9:
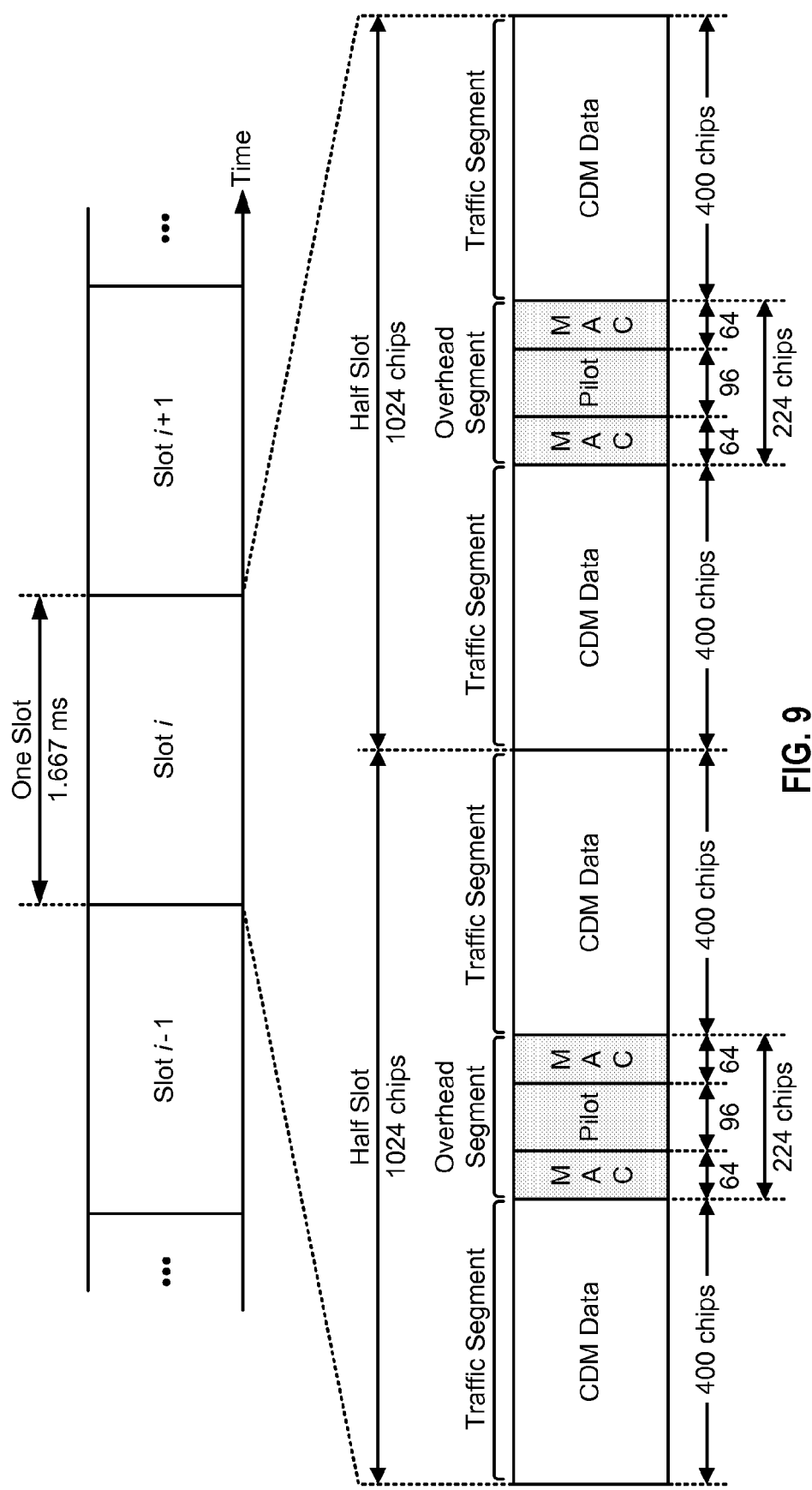
FIG. 9 illustrates CDM data-optimized (DO) slot structure.

FIG. 9 illustrates a slot structure that supports CDM on a DO forward link. The transmission timeline is partitioned into slots. Each slot has duration of 1.667 milliseconds (ms) and spans 2048 chips. Each chip has duration of 813.8 nanoseconds (ns) for a chip rate of 1.2288 mega chips/second (Mcps). Each slot is divided into two identical half-slots. Each half-slot includes (1) an overhead segment composed of a pilot segment at the center of the half-slot and two Media Access Control (MAC) segments on both sides of the pilot segment, and (2) two traffic segments on both sides of the overhead segment. The traffic segments may also be referred to as traffic channel segments, data segments, data fields, and similar expressions. The pilot segment carries pilot and has duration of 96 chips. Each MAC segment carries signaling (e.g., reverse power control or RPC information) and has duration of 64 chips. Each traffic segment carries traffic data (e.g., unicast data for specific terminals, broadcast data, etc.) and has duration of 400 chips.

Note that the CDM data shown in FIG. 9 may be selectively replaced with OFDM symbols, as is described in more detail in U.S. patent application Ser. No. 11/676,939 entitled Flexible Time-Frequency Multiplexing Structure for Wireless Communication, filed on the same date as the present application; see also U.S. patent application Ser. No. 11/677,000 entitled Spatial Pilot Structure for Multi-Antenna Wireless Communication, filed on the same date as the present application. The applications with the Ser. Nos. 11/676,939 and 11/677,000 are assigned to the assignee of the present Application and are expressly incorporated as if fully set forth herein, including all figures, tables, and claims.

DO Revisions 0, A, and B use CDM for data sent in the traffic segments. A traffic segment may carry CDM data for one or more terminals being served by a BTS. The traffic data for each terminal may be processed based on coding and modulation parameters determined by channel feedback received from that terminal to generate data symbols. The data symbols for the one or more terminals may be demultiplexed and covered with Walsh functions or codes to generate the CDM data for the traffic segment. The CDM data is thus generated in the time domain using Walsh functions. A CDM traffic segment is a traffic segment carrying CDM data.

Figure 10:
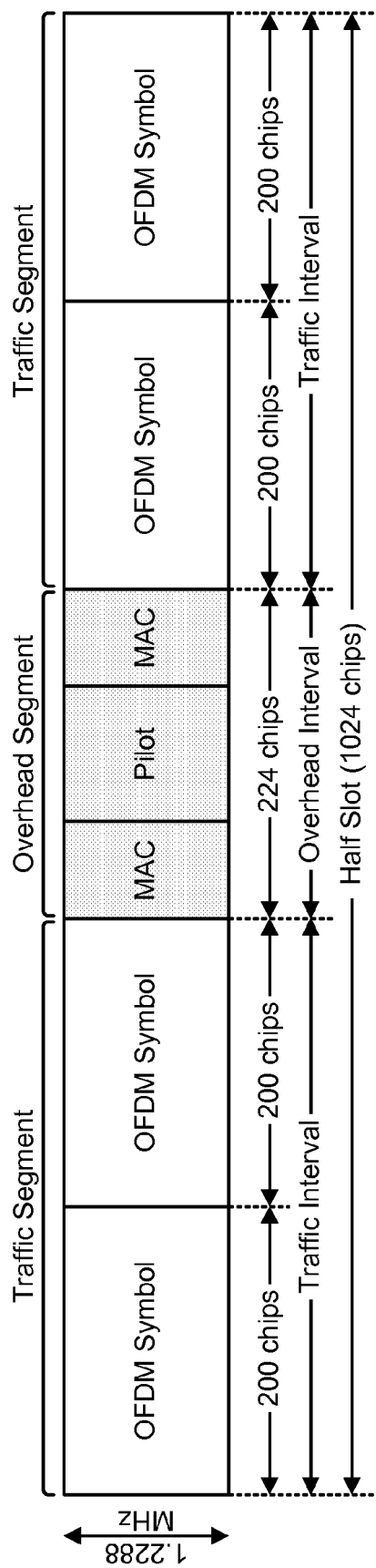
FIG. 10 illustrates a single-carrier slot structure capable of supporting orthogonal frequency division multiplexing (OFDM) in a DO system.

FIG. 10 shows a single-carrier slot structure that supports OFDM in DO. For simplicity, only one half-slot is shown. The half-slot includes (1) an overhead segment composed of a 96-chip pilot segment at the center of the half-slot and two 64-chip MAC segments on both sides of the pilot segment, and (2) two traffic segments on both sides of the overhead segment. In general, each traffic segment may carry one or more OFDM symbols. As shown in FIG. 10, each traffic segment carries two OFDM symbols, and each OFDM symbol has duration of 200 chips and is sent in one OFDM symbol period of 200 chips.

Space-Division Multiple Access (SDMA) provides additional dimensions. With SDMA, spatially-separable users (i.e., ATs) may be served with the same physical resources. Each spatially-separable AT feeds back the beam coefficients (according to a predefined codebook) to be used for forward link transmissions matched to the AT's forward link channel. SDMA is similar to MCW, except that different spatial layers may be designated to different ATs.

Turning now to the codebook design for multi-antenna operation, including SDMA and MIMO, different modes may be supported simultaneously, depending on the terminal channel quality and flow type (enabled by the codebook design). The codebook may be segmented into multiple sets, such as precoding transmission set, SDMA transmission set, and sets for different beam patterns. An AT and the radio network may negotiate the particular codebook set to be used for the AT's forward link, or the set may be fixed. A feedback index may then be used to indicate the desired mode for the AT.

Figure 11:
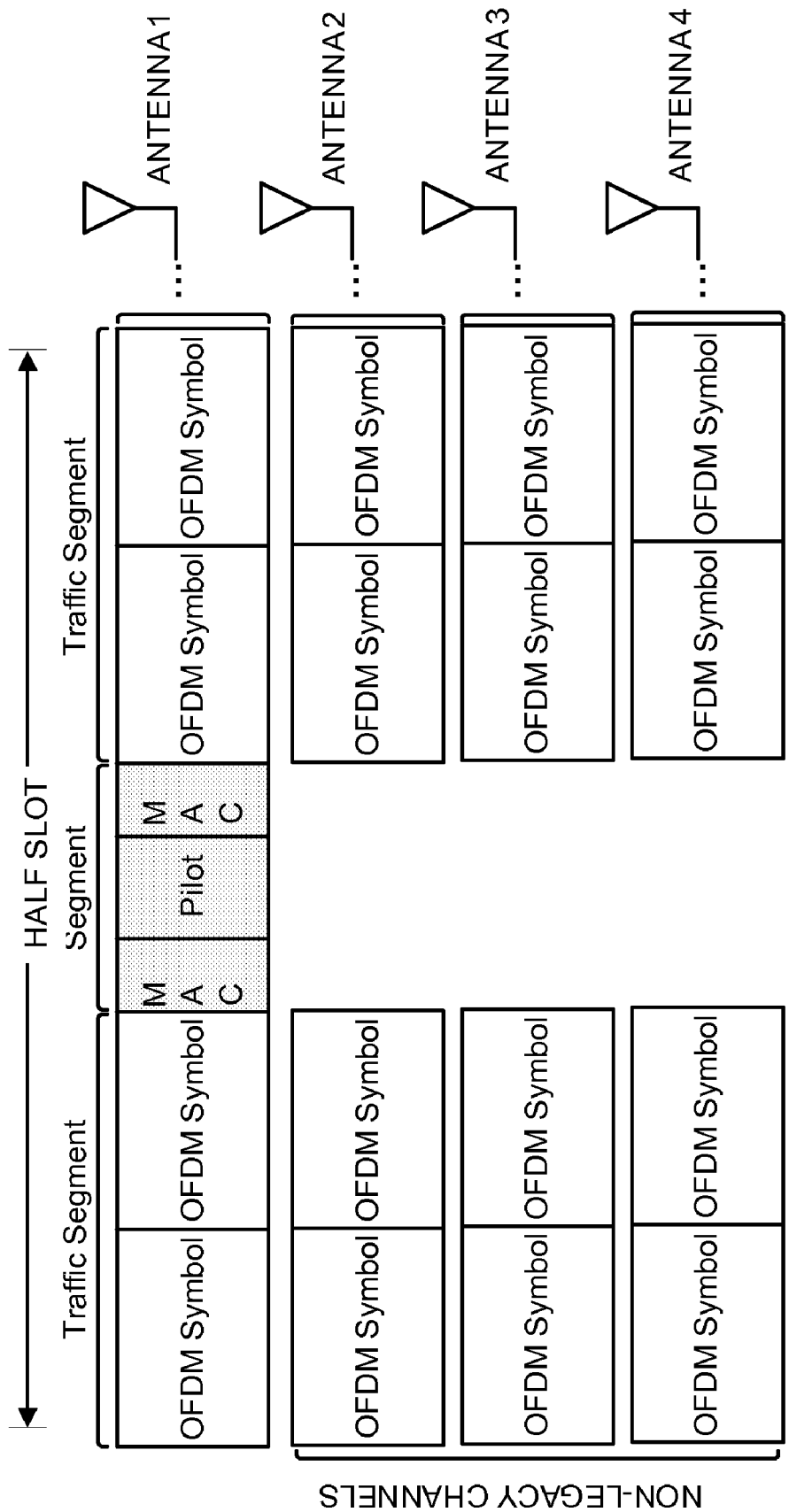
FIG. 11 illustrates a multi-carrier slot structure 400 capable of supporting OFDM in a DO system.

FIG. 11 illustrates a multi-carrier slot structure 400 that supports OFDM in DO. In DO Revision B, multiple 1xEV-DO waveforms may be multiplexed in the frequency domain to obtain a multi-carrier DO waveform that fills a given spectral allocation and is transmitted on a first transmit antenna. As illustrated in FIG. 11, one DO waveform is configured as a legacy channel including the pilot and MAC segments that may be demodulated by all active terminals, whereas the traffic segments may be demodulated by only the terminals being served. Hence, backward compatibility may be achieved by retaining the pilot and MAC segments. Also shown in FIG. 11 are three 1xEV-DO waveforms configured as non-legacy channels, transmitted on respective second, third and fourth transmit antennae, which do not require the overhead segments, because the OFDM symbols include periodic composite pilots (dedicated spatial pilots) embedded in the subbands or tones. In other words, some OFDM tones may be used as the dedicated pilots. A MIMO access terminal may receive the composite pilot in the OFDM symbols and is able to derive an estimate of the MIMO channel response.

FIGS. 12A-12D illustrate an exemplary pilot transmission scheme for a multi-antenna OFDM system. The spatial pilot tones may be differently formed according to the number of layers or beams that are formed by the multi-antenna OFDM system. FIG. 12A illustrates a single layer transmission across a half-slot of OFDM symbols 1-4. As illustrated for each OFDM symbol (such as OFDM symbol 1), the single layer spatial pilot tone repeats and occupies one tone for every 19 data tones. For a 180 tone OFDM symbol, there would be nine single layer spatial pilot tones. Specifically, for OFDM symbol 1 and OFDM symbol 3, the single layer spatial pilot tone is illustrated as beginning at tone one and repeating every 20 tones; and for OFDM symbol 2 and OFDM symbol 4, the single layer spatial pilot tone is illustrated as beginning halfway offset from the adjacent symbols at tone eleven and repeating every 20 tones. In an adjacent OFDM symbol, such as OFDM symbol 2, the single layer spatial pilot tones may be offset from the adjacent symbol's single layer spatial pilot tones. It is also noted that one OFDM symbol can leverage the offset position of an adjacent OFDM symbol's single layer spatial pilot tone for additional channel characterization without relying upon additional dedicated spatial pilot tones.

FIG. 12B illustrates a two layer transmission across a half-slot of OFDM symbols 1-4. As illustrated for each OFDM symbol, such as OFDM symbol 1, the first layer spatial pilot tone repeats and occupies one tone for every 19 data tones; and a second layer spatial tone is offset from the first and also repeats and occupies one tone for every 19 data tones. For a 180 tone OFDM symbol, there would be 18 first layer and second layer spatial pilot tones. Specifically, for OFDM symbol 1 and OFDM symbol 3, the first layer and second layer spatial pilot tones are illustrated as beginning at tone one and repeating every 10 tones and for OFDM symbol 2 and OFDM symbol 4, the first layer and second layer spatial pilot tones are illustrated as beginning halfway offset from the adjacent symbols at tone eleven and repeating every 10 tones. Accordingly, the bandwidth overhead for supporting the first layer and second layer spatial pilot tones is one in 10 or 10 percent per OFDM symbol for a two layer transmission.

FIG. 12C illustrates a three layer transmission across a half-slot of OFDM symbols 1-4. As illustrated for each OFDM symbol, the first layer spatial pilot tone repeats and occupies one tone for every 29 data tones, a second layer spatial pilot tone repeats and occupies one tone for every 29 data tones, and a third layer spatial pilot tone repeats and occupies one tone for every 29 data tones. The first layer, second layer, and third layer spatial pilot tones are staggered along the OFDM symbols 1-4 and repeat such that the first layer, second layer, and third layer spatial pilot tones repeat every 10 tones and occupy one tone for every nine data tones. For a 180 tone OFDM symbol, there would be 18 first layer, second layer, and third layer spatial pilot tones. Accordingly, the bandwidth overhead for supporting the first layer, second layer, and third layer spatial pilot tones is one in 10 or 10 percent per OFDM symbol for a three layer transmission.

FIG. 12D illustrates a four layer transmission across a half-slot of OFDM symbols 1-4. As illustrated for each OFDM symbol, the first layer spatial pilot tone repeats and occupies one tone for every 19 data tones, a second layer spatial pilot tone repeats and occupies one tone for every 19 data tones, a third layer spatial pilot tone repeats and occupies one tone for every 19 data tones, and a fourth layer spatial pilot tone repeats and occupies one tone for every 19 data tones. The first layer, second layer, third layer, and fourth layer spatial pilot tones are staggered along the OFDM symbols 1-4 and repeat such that the first layer, second layer, third layer, and fourth spatial pilot tones repeat every five tones and occupy one tone for every four data tones. For a 180 tone OFDM symbol, there would be 36 first layer, second layer, third layer, and fourth layer spatial pilot tones. Accordingly, the bandwidth overhead for supporting the first layer, second layer, third layer, and fourth layer spatial pilot tones is one in 5 or 20 percent per OFDM symbol for a four layer transmission.

Since the various layer spatial pilot tones are transmitted on different sets of pilot subbands in different symbol periods, this staggered pilot scheme allows the MIMO receivers to obtain pilot observations for more than their specific subbands without increasing the number of subbands used for pilot transmission in any one symbol period. For all pilot transmission schemes, the MIMO receivers may derive frequency response estimates for the channel based on their received symbols and using various channel estimation techniques.

Those of skill in the art would understand that although method steps have been described serially in this disclosure, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. It should be noted, however, that in selected variants the steps are performed in the actual order described. Furthermore, not every illustrated or described step may be required in every embodiment/variant in accordance with the invention, while some steps that have not been specifically illustrated or described may be desirable or necessary in some embodiments/variants in accordance with the invention.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

Figure 13:
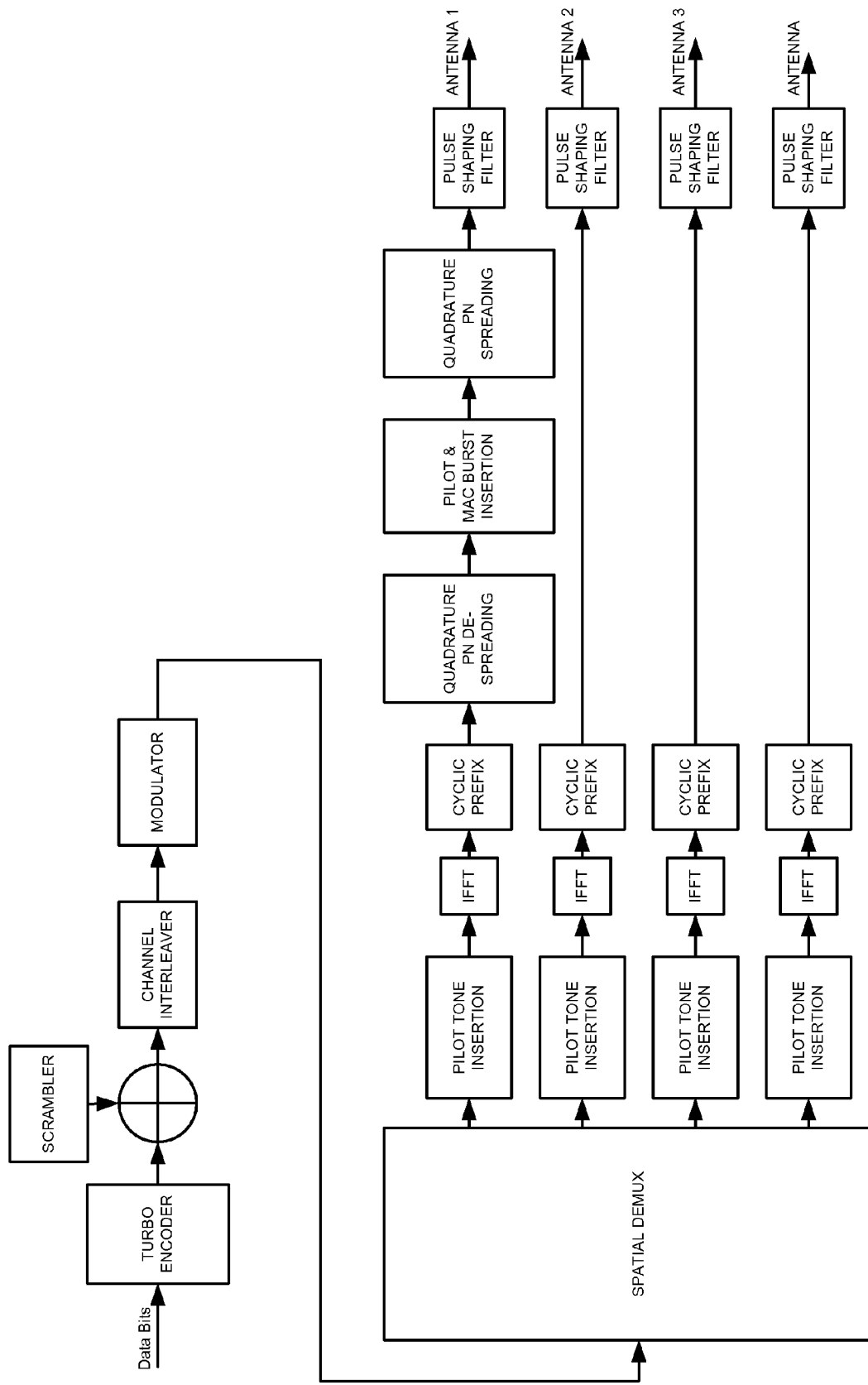
FIG. 13 illustrates selected blocks of a four-antenna transmitter with OFDM and reuse of the current DO architecture.

FIG. 13 illustrates selected forward link transmit blocks of a four-antenna variant with OFDM and reuse of the current DO architecture (revision A and Enhanced Broadcast and Multicast Services) for Ultra High Data Rate (UHDR) DO system. Note that the transmit channel at the top (antenna 1) includes blocks for inserting pilot and MAC bursts, for compatibility with legacy access terminals.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

The invention claimed is:

1. A method of sending feedback from an access terminal (AT) to a base transceiver station (BTS) of a radio network configured to communicate with the access terminal using multiple-in multiple-out (MIMO) technique, the method comprising:
   determining MIMO rank information of a first forward link between the BTS and the AT;
   determining MIMO spatial signature information of the forward link; and
   simultaneously transmitting
      (1) the MIMO rank information and the MIMO spatial signature information on an In-Phase signal component of a reverse link between the BTS and the AT, and
      (2) data rate control (DRC) information for a forward link on a Quadrature signal component of the reverse link.

2. The method of claim 1, wherein the radio network is configured to provide services to the AT and to at least one non-MIMO capable access terminal.

3. The method of claim 1, wherein the radio network is configured to provide services to the AT and to at least one non-MIMO capable access terminal, the AT and the at least one other non-MIMO access terminal being in the same sector.

4. The method of claim 1, wherein the radio network is a data-optimized radio network.

5. The method of claim 1, wherein the radio network is configured to provide services to non-MIMO capable access terminals.

6. The method of claim 1, wherein:
   the MIMO rank information consists of one bit; and
   the MIMO spatial signature information consists of three bits.

7. The method of claim 1, wherein:
   the MIMO rank information comprises one bit;
   the MIMO spatial signature information comprises three bits;
   the DRC information comprises four bits; and
   the MIMO rank information and the MIMO spatial signature information are transmitted on the In-Phase signal component as a four bit symbol.

8. The method of claim 1, further comprising:
   estimating spatial physical channels between a plurality of transmit antennae of the BTS and a plurality of receive antennae of the AT, the pluralities of transmit and receive antennae being configured for MIMO communication on the first forward link, the step of estimating providing a plurality of estimates of the first forward link;
   wherein:
      the step of determining MIMO rank information is performed based on the plurality of estimates of the first forward link; and
      the step of determining MIMO spatial signature information is performed based on the plurality of estimates of the first forward link.

9. An access terminal (AT) configured to communicate with a base transceiver station (BTS) of a radio network using multiple-in multiple-out (MIMO) technique, the access terminal comprising:
   a receiver configured to receive forward link transmissions from the BTS;
   a transmitter configured to send reverse link transmissions to the BTS;
   a memory storing program code; and
   a controller coupled to the receiver, the transmitter, and the memory, wherein the controller is configured to execute the program code to cause the AT to perform steps comprising:
      determining MIMO rank information of a first forward link between the BTS and the AT;
      determining MIMO spatial signature information of the forward link; and
      simultaneously transmitting
         (1) the MIMO rank information and the MIMO spatial signature information on an In-Phase signal component of a reverse link between the BTS and the AT, and
         (2) data rate control (DRC) information for a forward link on a Quadrature signal component of the reverse link.

10. The access terminal of claim 9, wherein the access terminal is configured to communicate with the radio network using an extension of a data-optimized communication standard.

11. The access terminal of claim 9, wherein:
   the MIMO rank information consists of one bit; and
   the MIMO spatial signature information consists of three bits.

12. The access terminal of claim 9, wherein:
   the MIMO rank information comprises one bit;
   the MIMO spatial signature information comprises three bits;
   the DRC information comprises four bits; and
   the MIMO rank information and the MIMO spatial signature information are transmitted on the In-Phase signal component as a four bit symbol.

13. The access terminal of claim 9, wherein:
   the controller is further configured to execute the program code to cause the AT to estimate spatial physical channels between a plurality of transmit antennae of the BTS and a plurality of receive antennae of the AT, to obtain a plurality of estimates of the first forward link, the pluralities of transmit and receive antennae being configured for MIMO communication on the first forward link;
   the step of determining MIMO rank information is performed based on the plurality of estimates of the first forward link; and
   the step of determining MIMO spatial signature information is performed based on the plurality of estimates of the first forward link.

14. A non-transitory, machine-readable medium comprising instructions, the instructions, when executed by at least one processor of an access terminal (AT) for communicating with a base transceiver station (BTS) of a radio network configured to communicate with the access terminal using multiple-in multiple-out (MIMO) technique, cause the AT to perform operations comprising:
   determining MIMO rank information of a first forward link between the BTS and the AT;
   determining MIMO spatial signature information of the forward link; and
   simultaneously transmitting
      (1) the MIMO rank information and the MIMO spatial signature information on an In-Phase signal component of a reverse link between the BTS and the AT, and
      (2) data rate control (DRC) information for a forward link on a Quadrature signal component of the reverse link.

15. A method of sending feedback from an access terminal (AT) to a base transceiver station (BTS) of a radio network configured to communicate with the access terminal using multiple-in multiple-out (MIMO) technique, the method comprising:

determining MIMO rank information of a first forward link between the BTS and the AT;

determining MIMO spatial signature information of the forward link; and step for simultaneously transmitting to the BTS the MIMO rank information and the MIMO spatial signature on an In-Phase signal component of a reverse link between the BTS and the AT, and data rate control (DRC) information on a Quadrature component of the reverse link.

16. A method of receiving feedback from an access terminal (AT) sent to a base transceiver station (BTS) of a radio network configured to communicate with the access terminal using multiple-in multiple-out (MIMO) technique, the method comprising:

simultaneously receiving (1) MIMO rank information of a forward link between the BTS and the AT and MIMO spatial signature information of the forward link on an In-Phase signal component of a reverse link between the BTS and the AT, and (2) data rate control (DRC) information for the forward link on a Quadrature signal component of the reverse link; and configuring the forward link in accordance with the MIMO rank information, MIMO spatial signature information, and the DRC information.

17. The method of claim 16, wherein the radio network is configured to provide services to the AT and to at least one non-MIMO capable access terminal.

18. The method of claim 16, wherein the radio network is configured to provide services to the AT and to at least one non-MIMO capable access terminal, the AT and the at least one other non-MIMO access terminal being in the same sector.

19. The method of claim 16, wherein the radio network is a data-optimized radio network.

20. The method of claim 16, wherein the radio network is configured to provide services to non-MIMO capable access terminals.

21. The method of claim 16, wherein:
the MIMO rank information consists of one bit; and
the MIMO spatial signature information consists of three bits.

22. The method of claim 16, wherein:
the MIMO rank information comprises one bit;
the MIMO spatial signature information comprises three bits; and
the DRC information comprises four bits.

23. A base transceiver station of a radio network configured to communicate with an access terminal (AT) using multiple-in multiple-out (MIMO) technique, the base transceiver station comprising:

a receiver configured to receive transmissions from the AT on a reverse link;

a transmitter configured to send transmissions to the AT on a forward link;

a memory storing program code; and a controller coupled to the receiver, transmitter, and the memory, wherein the controller is configured to execute the program code to cause the base transceiver station to perform steps comprising:

receiving from the AT MIMO rank information of the forward link and MIMO spatial signature information of the forward link on an In-Phase signal component of the reverse link;

receiving data rate control (DRC) information for the forward link on a Quadrature signal component of the reverse link; and configuring the base transceiver station to transmit to the AT on the forward link in accordance with the MIMO rank information, MIMO spatial signature information, and the DRC information.

24. The base transceiver station of claim 23, wherein the controller is further configured to execute the program code to cause the base transceiver station to provide services to at least one non-MIMO capable access terminal.

25. The base transceiver station of claim 23, wherein the controller is further configured to execute the program code to cause the base transceiver station to provide services to at least one non-MIMO capable access terminal, the at least one non-MIMO capable access terminal being in the same sector as the AT.

26. The base transceiver station of claim 23, wherein the radio network is a data-optimized radio network.

27. The base transceiver station of claim 23, wherein the radio network is configured to provide services to non-MIMO capable access terminals.

28. The base transceiver station of claim 23, wherein:
the MIMO rank information consists of one bit; and
the MIMO spatial signature information consists of three bits.

29. The base transceiver station of claim 23, wherein:
the MIMO rank information comprises one bit;
the MIMO spatial signature information comprises three bits; and
the DRC information comprises four bits.

30. A non-transitory, machine-readable medium comprising instructions, the instructions, when executed by at least one processor of a base transceiver station (BTS) configured for communicating with an access terminal (AT) using multiple-in multiple-out (MIMO) technique, cause the BTS to perform operations comprising:

simultaneously receiving (1) MIMO rank information of a forward link between the BTS and the AT and MIMO spatial signature information of the forward link on an In-Phase signal component of a reverse link between the BTS and the AT, and (2) data rate control (DRC) information for the forward link on a Quadrature signal component of the reverse link; and configuring the forward link in accordance with the MIMO rank information, MIMO spatial signature information, and the DRC information.

31. A method of receiving feedback from an access terminal (AT) sent to a base transceiver station (BTS) of a radio network configured to communicate with the access terminal using multiple-in multiple-out (MIMO) technique, the method comprising:

step for simultaneously receiving (1) MIMO rank information of a forward link between the BTS and the AT and MIMO spatial signature information of the forward link on an In-Phase signal component of a reverse link between the BTS and the AT, and (2) data rate control (DRC) information for the forward link on a Quadrature signal component of the reverse link; and configuring the forward link in accordance with the MIMO rank information, MIMO spatial signature information, and the DRC information.

32. A method of sending feedback from an access terminal (AT) to a base transceiver station (BTS) of a radio network configured to communicate with the access terminal using multiple-in multiple-out (MIMO) technique, the method comprising:
  determining MIMO rank information of a first forward link between the BTS and the AT;
  determining MIMO spatial signature information of the forward link; and
  simultaneously transmitting
    (1) the MIMO spatial signature information on an In-Phase signal component of a reverse link between the BTS and the AT, and
    (2) the MIMO rank information and data rate control (DRC) information for a forward link on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

33. The method of claim 32, wherein the radio network is configured to provide services to the AT and to at least one non-MIMO capable access terminal.

34. The method of claim 32, wherein the radio network is configured to provide services to the AT and to at least one non-MIMO capable access terminal, the AT and the at least one other non-MIMO access terminal being in the same sector.

35. The method of claim 32, wherein the radio network is a data-optimized radio network.

36. The method of claim 32, wherein the radio network is configured to provide services to non-MIMO capable access terminals.

37. The method of claim 32, wherein:
  the MIMO rank information consists of two bits; and
  the MIMO spatial signature information consists of four bits.

38. The method of claim 32, wherein:
  the MIMO rank information comprises two bits;
  the MIMO spatial signature information comprises four bits; and
  the DRC information comprises four bits.

39. The method of claim 32, further comprising:
  estimating spatial physical channels between a plurality of transmit antennae of the BTS and a plurality of receive antennae of the AT, the pluralities of transmit and receive antennae being configured for MIMO communication on the first forward link, the step of estimating providing a plurality of estimates of the first forward link;
  wherein:
    the step of determining MIMO rank information is performed based on the plurality of estimates of the first forward link; and
    the step of determining MIMO spatial signature information is performed based on the plurality of estimates of the first forward link.

40. An access terminal (AT) configured to communicate with a base transceiver station (BT) of a radio network using multiple-in multiple-out (MIMO) technique, the access terminal comprising:
  a receiver configured to receive forward link transmissions from the BTS;
  a transmitter configured to send reverse link transmissions to the BTS;
  a memory storing program code; and
  a controller coupled to the receiver, the transmitter, and the memory, wherein the controller is configured to execute the program code to cause the AT to perform steps comprising:
    determining MIMO rank information of a first forward link between the BTS and the AT;
    determining MIMO spatial signature information of the first forward link; and
    simultaneously transmitting
      (1) the MIMO spatial signature information on an In-Phase signal component of a reverse link between the BTS and the AT, and
      (2) the MIMO rank information and data rate control (DRC) information for a forward link on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

41. The access terminal of claim 40, wherein the access terminal is configured to communicate with the radio network using an extension of a data-optimized communication standard.

42. The access terminal of claim 40, wherein:
  the MIMO rank information consists of two bits; and
  the MIMO spatial signature information consists of four bits.

43. The access terminal of claim 40, wherein:
  the MIMO rank information comprises two bits;
  the MIMO spatial signature information comprises four bits; and
  the DRC information comprises four bits.

44. The access terminal of claim 40, wherein:
  the controller is further configured to execute the program code to cause the AT to estimate spatial physical channels between a plurality of transmit antennae of the BTS and a plurality of receive antennae of the AT, to obtain a plurality of estimates of the first forward link, the pluralities of transmit and receive antennae being configured for MIMO communication on the first forward link;
  the step of determining MIMO rank information is performed based on the plurality of estimates of the first forward link; and
  the step of determining MIMO spatial signature information is performed based on the plurality of estimates of the first forward link.

45. A non-transitory, machine-readable medium comprising instructions, the instructions, when executed by at least one processor of an access terminal (AT) for communicating with a base transceiver station (BTS) of a radio network configured to communicate with the AT using multiple-in multiple-out (MIMO) technique, cause the AT to perform operations comprising:
  determining MIMO rank information of a first forward link between the BTS and the AT;
  determining MIMO spatial signature information of the forward link; and
  simultaneously transmitting
    (1) the MIMO spatial signature information on an In-Phase signal component of a reverse link between the BTS and the AT, and
    (2) the MIMO rank information and data rate control (DRC) information for a forward link on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

46. A method of sending feedback from an access terminal (AT) to a base transceiver station (BTS) of a radio network configured to communicate with the AT using multiple-in multiple-out (MIMO) technique, the method comprising:
determining MIMO rank information of a first forward link between the BTS and the AT;
determining MIMO spatial signature information of the forward link;
step for simultaneously transmitting to the BTS the MIMO spatial signature information on an In-Phase signal component of a reverse link between the BTS and the AT, and data rate control (DRC) information and the MIMO rank information on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

47. A method of processing feedback sent from an access terminal (AT) to a base transceiver station (BTS) of a radio network configured to communicate with the AT using multiple-in multiple-out (MIMO) technique, the method comprising:
simultaneously receiving
(1) MIMO rank information and data rate control (DRC) information of a forward link between the BTS and the AT on a Quadrature signal component of a reverse link between the BTS and the AT, and
(2) MIMO spatial signature information for the forward link on an In-Phase signal component of the reverse link; and
configuring the forward link in accordance with the MIMO rank information, MIMO spatial signature information, and the DRC information.

48. The method of claim 47, wherein the radio network is configured to provide services to the AT and to at least one non-MIMO capable access terminal.

49. The method of claim 47, wherein the radio network is configured to provide services to the AT and to at least one non-MIMO capable access terminal, the AT and the at least one other non-MIMO access terminal being in the same sector.

50. The method of claim 47, wherein the radio network is a data-optimized radio network.

51. The method of claim 47, wherein the radio network is configured to provide services to non-MIMO capable access terminals in accordance.

52. The method of claim 47 wherein:
the MIMO rank information consists of two bits; and
the MIMO spatial signature information consists of four bits.

53. The method of claim 47, wherein:
the MIMO rank information comprises two bits;
the MIMO spatial signature information comprises four bits; and
the DRC information comprises four bits.

54. A base transceiver station of a radio network configured to communicate with an access terminal (AT) using multiple-in multiple-out (MIMO) technique, the base transceiver station comprising:
a receiver configured to receive transmissions from the AT on a reverse link;
a transmitter configured to send transmissions to the AT on a forward link;
a memory storing program code; and
a controller coupled to the receiver, the transmitter, and the memory, wherein the controller is configured to execute the program code to cause the base transceiver station to perform steps comprising:
simultaneously receiving
(1) MIMO rank information and data rate control (DRC) information of the forward link between the BTS and the AT on a Quadrature signal component of the reverse link between the BTS and the AT, and
(2) MIMO spatial signature information for the forward link on an In-Phase signal component of the reverse link; and
configuring the forward link in accordance with the MIMO rank information, MIMO spatial signature information, and the DRC information.

55. The base transceiver station of claim 54, wherein the controller is further configured to execute the program code to cause the base transceiver station to provide services to at least one non-MIMO capable access terminal.

56. The base transceiver station of claim 54, wherein the controller is further configured to execute the program code to cause the base transceiver station to provide services to at least one non-MIMO capable access terminal, the at least one non-MIMO capable access terminal being in the same sector as the AT.

57. The base transceiver station of claim 54, wherein the radio network is a data-optimized radio network.

58. The base transceiver station of claim 54, wherein the radio network is configured to provide services to non-MIMO capable access terminals.

59. The base transceiver station of claim 54, wherein:
the MIMO rank information consists of two bits; and
the MIMO spatial signature information consists of four bits.

60. The base transceiver station of claim 54, wherein:
the MIMO rank information comprises two bits;
the MIMO spatial signature information comprises four bits; and
the DRC information comprises four bits.

61. A non-transitory, machine-readable medium comprising instructions, the instructions, when executed by at least one processor of a base transceiver station (BTS) configured for communicating with an access terminal (AT) using multiple-in multiple-out (MIMO) technique, cause the BTS to perform operations comprising:
simultaneously receiving
(1) MIMO rank information and data rate control (DRC) information of a forward link between the BTS and the AT on a Quadrature signal component of a reverse link between the BTS and the AT, and
(2) MIMO spatial signature information for the forward link on an In-Phase signal component of the reverse link; and
configuring the forward link in accordance with the MIMO rank information, MIMO spatial signature information, and the DRC information.

62. A method of receiving feedback sent from an access terminal (AT) to a base transceiver station (BTS) of a radio network configured to communicate with the access terminal using multiple-in multiple-out (MIMO) technique, the method comprising:
step for simultaneously receiving
(1) MIMO rank information and data rate control (DRC) information of a forward link between the BTS and the AT on a Quadrature signal component of a reverse link between the BTS and the AT, and (2) MIMO spatial signature information for the forward link on an In-Phase signal component of the reverse link; and configuring the forward link in accordance with the MIMO rank information, MIMO spatial signature information, and the DRC information.

63. An apparatus for sending feedback from an access terminal (AT) to a base transceiver station (BTS) of a radio network configured to communicate with the access terminal using multiple-in multiple-out (MIMO) technique, the apparatus comprising:

means for determining MIMO rank information of a first forward link between the BTS and the AT;

means for determining MIMO spatial signature information of the forward link; and means for simultaneously transmitting
(1) the MIMO rank information and the MIMO spatial signature information on an In-Phase signal component of a reverse link between the BTS and the AT, and
(2) data rate control (DRC) information for a forward link on a Quadrature signal component of the reverse link.

64. An apparatus for receiving feedback from an access terminal (AT) sent to a base transceiver station (BTS) of a radio network configured to communicate with the access terminal using multiple-in multiple-out (MIMO) technique, the apparatus comprising:

means for simultaneously receiving
(1) MIMO rank information of a forward link between the BTS and the AT and MIMO spatial signature information of the forward link on an In-Phase signal component of a reverse link between the BTS and the AT, and
(2) data rate control (DRC) information for the forward link on a Quadrature signal component of the reverse link; and means for configuring the forward link in accordance with the MIMO rank information, MIMO spatial signature information, and the DRC information.

65. An apparatus for sending feedback from an access terminal (AT) to a base transceiver station (BTS) of a radio network configured to communicate with the access terminal using multiple-in multiple-out (MIMO) technique, the apparatus comprising:

means for determining MIMO rank information of a first forward link between the BTS and the AT;

means for determining MIMO spatial signature information of the forward link; and means for simultaneously transmitting (1) the MIMO spatial signature information on an In-Phase signal component of a reverse link between the BTS and the AT, and (2) the MIMO rank information and data rate control (DRC) information for a forward link on a Quadrature signal component of the reverse link, wherein the MIMO rank information is covered by a first codeword Walsh cover, the DRC information is covered by a second codeword Walsh cover, the second codeword Walsh cover being orthogonal to the first Walsh cover.

66. An apparatus for processing feedback sent from an access terminal (AT) to a base transceiver station (BTS) of a radio network configured to communicate with the AT using multiple-in multiple-out (MIMO) technique, the apparatus comprising:

means for simultaneously receiving
(1) MIMO rank information and data rate control (DRC) information of a forward link between the BTS and the AT on a Quadrature signal component of a reverse link between the BTS and the AT, and
(2) MIMO spatial signature information for the forward link on an In-Phase signal component of the reverse link; and means for configuring the forward link in accordance with the MIMO rank information, MIMO spatial signature information, and the DRC information.

* * * * *